(12) United States Patent
Jha et al.

(10) Patent No.: US 12,375,961 B2
(45) Date of Patent: *Jul. 29, 2025

(54) METHOD AND SYSTEM FOR MANAGING NEW RADIO (NR) COMMUNICATION IN AN ELECTRONIC DEVICE

(71) Applicant: Samsung Electronics Co., Ltd., Gyeonggi-do (KR)

(72) Inventors: Kailash Kumar Jha, Bangalore (IN); Alok Kumar Jangid, Bangalore (IN); Mudit Goel, Bangalore (IN); Nishant, Bangalore (IN); Nitesh Pushpak Shah, Bangalore (IN)

(73) Assignee: Samsung Electronics Co., Ltd (KR)

( * ) Notice: Subject to any disclaimer, the term of this patent is extended or adjusted under 35 U.S.C. 154(b) by 578 days.

This patent is subject to a terminal disclaimer.

(21) Appl. No.: 17/707,087

(22) Filed: Mar. 29, 2022

(65) Prior Publication Data
US 2022/0225148 A1    Jul. 14, 2022

Related U.S. Application Data

(63) Continuation of application No. 16/857,586, filed on Apr. 24, 2020, now Pat. No. 11,356,880.

(30) Foreign Application Priority Data

Apr. 25, 2019   (IN) .............................. 201941016441
Jun. 18, 2019   (IN) .............................. 201941024163
Apr. 17, 2020   (IN) .............................. 201941016441

(51) Int. Cl.
*H04W 24/10*     (2009.01)
*H04W 8/22*      (2009.01)
(Continued)

(52) U.S. Cl.
CPC ............. *H04W 24/10* (2013.01); *H04W 8/22* (2013.01); *H04W 52/0251* (2013.01);
(Continued)

(58) Field of Classification Search
None
See application file for complete search history.

(56) References Cited

U.S. PATENT DOCUMENTS 9,820,332 B2   11/2017  Lee et al.
10,313,934 B2 *  6/2019  Wu ........................ H04L 5/0035
(Continued)

FOREIGN PATENT DOCUMENTS

CN       109151921       1/2019
KR     1020210017030     2/2021
(Continued)

OTHER PUBLICATIONS

Nokia et al., "Measurement Coordination for LTE-NR Tight Interworking", R2-1702693, 3GPP TSG-RAN WG2 Meeting #97bis, Apr. 3-7, 2017, 5 pages.
(Continued)

*Primary Examiner* — Christine T Duong
(74) *Attorney, Agent, or Firm* — The Farrell Law Firm, P.C.

(57) ABSTRACT

Disclosed is an electronic device including a wireless communication circuitry capable of supporting dual connectivity for a first cellular communication network and a second cellular communication network, a processor operatively connected with the wireless communication circuitry, and a memory operatively connected to the processor, wherein the memory stores instructions that, when executed by the processor, cause the electronic device to establish a connection with the second cellular communication network as a secondary cell group (SCG) based at least in part on control
(Continued)

information received from the first cellular communication network, monitor a condition of the electronic device, and report, if the condition is satisfied, an SCG failure to at least one of the first cellular communication network or the second cellular communication network for releasing the second cellular communication network, wherein the condition includes no mobile activity of the electronic device.

18 Claims, 17 Drawing Sheets

(51) Int. Cl.
    *H04W 52/02*     (2009.01)
    *H04W 76/16*     (2018.01)
    *H04W 36/00*     (2009.01)
    *H04W 88/06*     (2009.01)

(52) U.S. Cl.
    CPC ...... *H04W 76/16* (2018.02); *H04W 36/00698* (2023.05); *H04W 88/06* (2013.01)

(56) References Cited

U.S. PATENT DOCUMENTS

| | | | |
|---|---|---|---|
| 10,848,983 B2 | 11/2020 | Martin | |
| 10,979,952 B2 | 4/2021 | Kim et al. | |
| 11,178,564 B2 | 11/2021 | Kim | |
| 11,178,588 B2 | 11/2021 | Zhang | |
| 2014/0038609 A1 | 2/2014 | Henttonen et al. | |
| 2015/0038141 A1 | 2/2015 | Cheng | |
| 2016/0112924 A1 | 4/2016 | Turakhia et al. | |
| 2018/0092085 A1 | 3/2018 | Shaheen et al. | |
| 2019/0215719 A1* | 7/2019 | Wei | H04W 28/06 |
| 2019/0254100 A1* | 8/2019 | Yu | H04W 76/19 |
| 2020/0022215 A1 | 1/2020 | Takahashi et al. | |
| 2020/0059985 A1 | 2/2020 | Henttonen et al. | |
| 2020/0163144 A1 | 5/2020 | Ryoo | |
| 2020/0169906 A1* | 5/2020 | Tsuboi | H04W 76/27 |
| 2020/0229058 A1 | 7/2020 | Park | |
| 2020/0314946 A1 | 10/2020 | Tsuboi | |
| 2021/0068000 A1 | 3/2021 | Tao | |
| 2021/0153281 A1 | 5/2021 | Deogun et al. | |
| 2023/0037980 A1* | 2/2023 | Kim | H04W 72/0446 |

FOREIGN PATENT DOCUMENTS

| | | |
|---|---|---|
| WO | WO 2018/174038 | 9/2018 |
| WO | WO 2018/203306 | 11/2018 |
| WO | WO 2018/203710 | 11/2018 |

OTHER PUBLICATIONS

European Search Report dated Apr. 4, 2022 issued in counterpart application No. 20795115.3-1212, 14 pages.
Chinese Office Action dated Dec. 15, 2023 issued in counterpart application No. 202080030891.9, 17 pages.
Indian Hearing Notice dated Dec. 13, 2023 issued in counterpart application No. 201941016441, 2 pages.
Qualcomm Incorporated, "Considerations on NR Measurements after SCG Failure", R2-1806013, 3GPP TSG-RAN WG2 Meeting #101bis, Apr. 16-20, 2018, 2 pages.
China Telecom, "NR Configuration Handling when NAS Disable NR Capability", R2-1802680, 3GPP TSG-RAN WG2# 101, Feb. 26-Mar. 2, 2018, 2 pages.
Huawei, HiSilicon, "Events and Measurements for Handover from NR to E-UTRA", R2-1708705, 3GPP TSG-RAN WG2#99, Aug. 21-25, 2017, 2 pages.
International Search Report dated Jul. 31, 2020 issued in counterpart application No. PCT/KR2020/005499, 9 pages.
3GPP, 3rd Generation Partnership Project; Technical Specification Group Radio Access Network; NR; Radio Resource Control (RRC) Protocol Specification, (Release 15), 3GPP TS 38.331 V15.3.0, Sep. 2018, 446 pages.
Indian Examination Report dated Nov. 3, 2021 issued in counterpart application No. 201941016441, 6 pages.
ETSI TS 136 331 V15.3.0, (Oct. 2018), pp. 916.
European Search Report dated Sep. 9, 2024 issued in counterpart application No. 24179503.8-1215, 7 pages.

* cited by examiner

METHOD AND SYSTEM FOR MANAGING NEW RADIO (NR) COMMUNICATION IN AN ELECTRONIC DEVICE

CROSS-REFERENCE TO RELATED APPLICATIONS

This application is a Continuation Application of U.S. patent application Ser. No. 16/857,586, filed on Apr. 24, 2020, and is based on and claims priority under 35 U.S.C. § 119 to Indian Provisional Patent Application No. 201941016441, filed on Apr. 25, 2019, in the Indian Patent Office (IPO), Indian Provisional Patent Application No. 201941024163, filed on Jun. 18, 2019, in the IPO, and Indian Non-Provisional Patent Application No. 201941016441, filed on Apr. 17, 2020, in the IPO, the disclosure of each of which is incorporated by reference herein in their entireties.

BACKGROUND

1. Field

The disclosure relates generally to wireless communication systems, and more particularly, to methods and systems for managing new radio (NR) communication in an electronic device in the wireless communication systems.

2. Description of Related Art

The introduction of NR technology (also referred to as fifth generation (5G) technology or 5G NR technology) may result in changes in mobile network architecture. These changes may result in mobile network architectures supporting multiple radio access technologies (RATs), such as NR, evolved packet core (EPC), evolved—universal mobile telecommunication system terrestrial radio access network (E-UTRAN), global system for mobile communications—evolution RAN (G-ERAN), and universal mobile telecommunication system—terrestrial RAN (U-TRAN). Management of electronic device (or user equipment (UE)) connections within these mobile network architectures supporting multiple RATs may introduce situations that did not need to be addressed in legacy mobile network architectures.

If the electronic device supports an E-UTRAN NR-dual connectivity (EN-DC) feature, a long term evolution (LTE) RAT bearing network would become a master cell group (MCG) bearer and the NR RAT bearing network would become a secondary cell group (SCG) bearer. The MCG may function as the anchor cell group band and the electronic device performs initial registration to the anchor cell group. The anchor cell group may add one or more secondary cells of the SCG. When configured with the EN-DC, user data carried by a dedicated radio bearer (DRB) may either be transferred via MCG, via NR SCG or via both the MCG and the NR SCG. Also, radio resource control (RRC) signaling carried by a signaling radio bearer (SRB) may either be transferred via the MCG or via both the MCG and the NR SCG.

In addition, a base station (or evolved node B (eNB)) may configure an RRC connected electronic device to perform measurements and the electronic device may report a measurement report in accordance with the measurement configuration. The base station may configure different types of measurements such as NR measurements and inter-RAT measurements of E-UTRAN frequencies. Based on receiving a NR measurement report from the electronic device, the base station may add an NR SCG for dual connectivity. The SCG is a radio bearer for additional resources (such as 5G services) served only by a next generation base station (gNB). However, performing frequent NR measurements and adding NR SCG would unnecessarily consume power in the electronic device.

As an example, FIG. 1 illustrates a schematic diagram of a conventional method of no data activity or minimal data activity or when mobile data is turned-off or when wireless fidelity (Wi-Fi) connection occurs in the electronic device, while performing NR measurements.

At step 1, the electronic device sends attach request including dual connectivity with NR supported, to the eNB, and the attach request may be accepted by the eNB. An Internet protocol (IP) multimedia subsystem (IMS)—packet data network (PDN) may be established between the eNB and the electronic device as illustrated in FIG. 1.

At step 2, a voice over LTE (VoLTE) call may be started by the electronic device using the IMS PDN, based on a user request. Simultaneously, the eNB may transmit configuration information corresponding to an event B1-NR, to the electronic device for performing NR measurements, during a VoLTE call and no/minimal data activity. The event B1 is for inter-RAT measurements.

At step 3, the electronic device transmits a B1-NR measurement report to the eNB, and in response, the SCG may be added by the eNB, based on an event B1-NR, even though no/minimal data activity is observed in the electronic device. The event B1-NR is for NR RAT measurements. Adding the SCG which may not be required during no/minimal data activity tends to cause excessive power consumption in the electronic device.

Similarly, if mobile data is turned-off in the electronic device in FIG. 1, steps 1 and 2 are similar as described above when there is mobile/no minimal data activity. At step 3, the electronic device transmits a B1-NR measurement report to the eNB, and in response, the SCG may be added by the eNB, based on event B1-NR, even though the mobile data is turned off in the electronic device. Adding the SCG which may not be required during the mobile data turned-off condition of the electronic device, tends to cause excessive power consumption in the electronic device.

If the electronic device in FIG. 1 is connected to a Wi-Fi network, steps 1 and 2 are similar to those described above in the case of mobile/no minimal data activity. The electronic device is connected to the Wi-Fi network, during which time the IMS PDN may not be required. At step 3, the electronic device may transmit a B1-NR measurement report to the eNB, and in response, the SCG may be added by the eNB, based on event B1-NR, even though the electronic device is connected to the Wi-Fi network. Adding the SCG which may not be required during the connection to the Wi-Fi network condition of the electronic device, tends to cause excessive power consumption in the electronic device.

If the condition of mobile data turned off, no/minimal data activity is observed, and the Wi-Fi network connection to the electronic device is detected after adding the SCG, the conventional methods may not release the added SCG, even though there is no requirement to retain the SCG. There tends to occur unnecessary power consumption in the electronic device to retain the SCG, due to no/minimal data activity/Wi-Fi network/mobile data being turned off.

FIG. 2A illustrates a conventional method of no/minimal data activity or turned off mobile data or a connection to Wi-Fi is on in the electronic device.

At step 202a, the electronic device sends attach request including dual connectivity with NR supported, to the MME. Only in case of mobile data being turned off or the electronic device being connected to Wi-Fi, is the attach request sent along with a default access point name (APN) as Internet. At step 202*b*, the attach request is accepted by the MME without restricting use of dual connectivity. At step 202*c*, an internet PDN may be established between the MME and the electronic device. At step 202*d*, an IP multimedia subsystem (IMS)—PDN may be established between the MME and the electronic device, even if no/minimal data activity is observed in electronic device. In case of mobile data being turned-off or the electronic device is connected to Wi-Fi, the IMS PDN may not be established. At step 202*e*, the configuration information for an event B1-NR measurement is received from the base station. At a step 202*f*, no/minimal data activity or mobile data is turned off or a connected to Wi-Fi condition in the electronic device is observed. At step 202*g*, the electronic device performs B1-NR measurements of the next-generation base station even though the addition of the SCG is not required as electronic device is in condition of no/minimal data activity or turned-off mobile data or connection to Wi-Fi. At step 202*h*, the base station adds NR as the SCG based on the B1-NR measurement report, which tends to cause unnecessary power consumption in the electronic device.

FIG. 2B illustrates a conventional method in which the SCG is not added by the base station even after multiple B1-NR measurement reports are sent by the electronic device. At a step 208*a*, the RRC is in a connected state with the base station such as the LTE network. At step 208*b*, an RRC reconfiguration with an NR measurement object is transmitted by the base station to the electronic device. At steps 208*c*-208*g*, the B1-NR measurement report with the NR cell is transmitted multiple times by the electronic device to the base station. Even though there is a continuous measurement report containing the NR cell, the base station does not add the SCG.

FIG. 2C illustrates a conventional method in which there is frequent NR-radio link failure (NR-RLF) due to the transmission power limitation issue in the electronic device. At step 210*a*, the RRC is in connected state with the LTE network. At step 210*b*, RRC reconfiguration with NR measurement object is transmitted by the base station to the electronic device. At step 210*c*, the B1-NR measurement report with NR cell is transmitted by the electronic device to the base station. At step 210*d*, RRC reconfiguration with an SCG addition is transmitted by the base station to the electronic device. Accordingly, at step 210*e*, data transfer between the electronic device and the next-generation base station is performed.

At step 210*f*, the electronic device moves to the LTE cell edge area and the LTE transmission power is increased by the electronic device. At step 210*g*, high transmission power in LTE may be provided for VoLTE continuity. At step 210*h*, the RLF may occur in the NR due to low transmission power. As a result, at step 210*i*, the LTE is in RRC connected mode. At step 210*j*, RRC reconfiguration with an NR measurement object is transmitted by the base station to the electronic device. At step 210*k*, the B1-NR measurement report with an NR cell is transmitted by the electronic device to the base station. At step 210*l*, RRC reconfiguration with the SCG addition is transmitted by the base station to the electronic device. Accordingly, at step 210*m*, data transfer between the electronic device and the next-generation base station is performed. At step 210*n*, the electronic device moves to the LTE cell edge area and the LTE transmission power is increased by the electronic device. At step 210*o*, high transmission power in LTE may be provided for VoLTE continuity. At step 210*p*, the RLF may occur in the NR due to low transmission power in the NR. Accordingly, there is a frequent NR as the SCG addition occurs and frequent NR RLF in a short duration, which tends to consume excessive power in the electronic device.

FIG. 2D illustrates a conventional method in which there is frequent NR radio link failure (NR-RLF) due to the NR cell edge area of the electronic device. At step 212*a*, the RRC is in the connected state with the LTE network. At step 212*b*, RRC reconfiguration with NR measurement object is transmitted by the base station to the electronic device. At step 212*c*, the B1-NR measurement report with NR cell is transmitted by the electronic device to the base station. At step 212*d*, RRC reconfiguration with SCG addition is transmitted by the base station to the electronic device. Accordingly, at step 212*e*, data transfer between the electronic device and the next generation base station is performed.

At step 212*f*, the electronic device moves to NR cell edge area. At step 212*g*, due to a poor NR RLF signal, the NR RLF may occur. As a result, at step 212*h*, the RRC reconfiguration with NR measurement object is transmitted by the base station to the electronic device. At step 212*i*, the B1-NR measurement report with NR cell is transmitted by the electronic device to the base station. At step 212*j*, RRC reconfiguration with the SCG addition is transmitted by the base station to the electronic device. Accordingly, at step 212*k*, data transfer between the electronic device and the next-generation base station is performed. At step 212*l*, the electronic device moves to the NR cell edge area. At step 212*m*, due to the poor NR RLF signal, the NR RLF may occur. Accordingly, there is a frequent NR as the SCG addition occurs and frequent NR RLF in a short duration, which tends to consume excessive power in the electronic device.

FIG. 2E illustrates a conventional method in which there is frequent NR sync failure or NR random access channel (RACH) failure. At step 214*a*, the RRC is in connected state with the LTE network. At step 214*b*, RRC reconfiguration with NR measurement object is transmitted by the base station to the electronic device. At step 214*c*, the B1-NR measurement report with NR cell is transmitted by the electronic device to the base station. At step 214*d*, RRC reconfiguration with the SCG addition is transmitted by the base station to the electronic device. At step 214*e*, a NR cell search failure or NR RACH failure may occur. As a result, at step 214*f*, the B1-NR measurement report with the NR cell is transmitted by the electronic device to the base station. At step 214*g*, RRC reconfiguration with the SCG addition is transmitted by the base station to the electronic device. At step 214*h*, a NR cell search failure or NR RACH failure may re-occur. As a result, at step 214*i*, the B1-NR measurement report with the NR cell is re-transmitted by the electronic device to the base station. At step 214*j*, RRC reconfiguration with the SCG addition is transmitted by the base station to the electronic device. At step 214*k*, a NR cell search failure or NR RACH failure may occur. Accordingly, there is a frequent NR as the SCG addition occurs and frequent NR cell search or NR RACH failure in a short duration, which tends to consume excessive power in the electronic device.

Accordingly, there is a need in the art for a method and a system that eliminate such excessive and unnecessary power consumption by an electronic device in NR communication.

SUMMARY

Aspects of the disclosure are to address at least the above-mentioned problems and/or disadvantages and to provide at least the advantages described below. Accordingly, an aspect of the disclosure is to provide a method and a system that mitigate excessive power consumption in an electronic device in NR communication.

Another aspect of the disclosure is to provide a method and system that reduces power consumption in an EN-DC device, when there is no/minimal data activity or mobile data is off or the device is connected to Wi-Fi.

In accordance with an aspect of the disclosure, an electronic device includes a wireless communication circuitry capable of supporting dual connectivity for a first cellular communication network and a second cellular communication network, a processor operatively connected with the wireless communication circuitry, and a memory operatively connected to the processor, wherein the memory stores instructions that, when executed by the processor, cause the electronic device to establish a connection with the second cellular communication network as a secondary cell group (SCG) based at least in part on control information received from the first cellular communication network, monitor a condition of the electronic device, and report, if the condition is satisfied, an SCG failure to at least one of the first cellular communication network or the second cellular communication network for releasing the second cellular communication network, wherein the condition includes no mobile activity of the electronic device.

In accordance with another aspect of the disclosure, an electronic device includes a wireless communication circuitry capable of supporting dual connectivity for a first cellular communication network and a second cellular communication network, a processor operatively connected with the wireless communication circuitry, and a memory operatively connected to the processor, wherein the memory stores instructions that, when executed by the processor, cause the electronic device to establish a connection with the second cellular communication network as an SCG based at least in part on control information received from the first cellular communication network, monitor a condition of the electronic device, and release, if the condition is satisfied, the second cellular communication network and stop a measurement report for the second cellular communication network, wherein the condition includes no mobile activity of the electronic device.

In accordance with another aspect of the disclosure, an electronic device includes a wireless communication circuitry capable of supporting dual connectivity for a first cellular communication network and a second cellular communication network, a processor operatively connected with the wireless communication circuitry, and a memory operatively connected to the processor, wherein the memory stores instructions that, when executed by the processor, cause the electronic device to establish a connection with the second cellular communication network as an SCG based at least in part on control information received from the first cellular communication network, monitor a condition of the electronic device, and release, if the condition is satisfied, the second cellular communication network and restrict capability of the electronic device for the second cellular communication network, wherein the condition includes no mobile activity of the electronic device.

BRIEF DESCRIPTION OF THE DRAWINGS

The above and other aspects, features and advantages of certain embodiments of the disclosure will be more apparent from the following detailed description, taken in conjunction with the accompanying drawings, in which.

DETAILED DESCRIPTION

Figure 1:
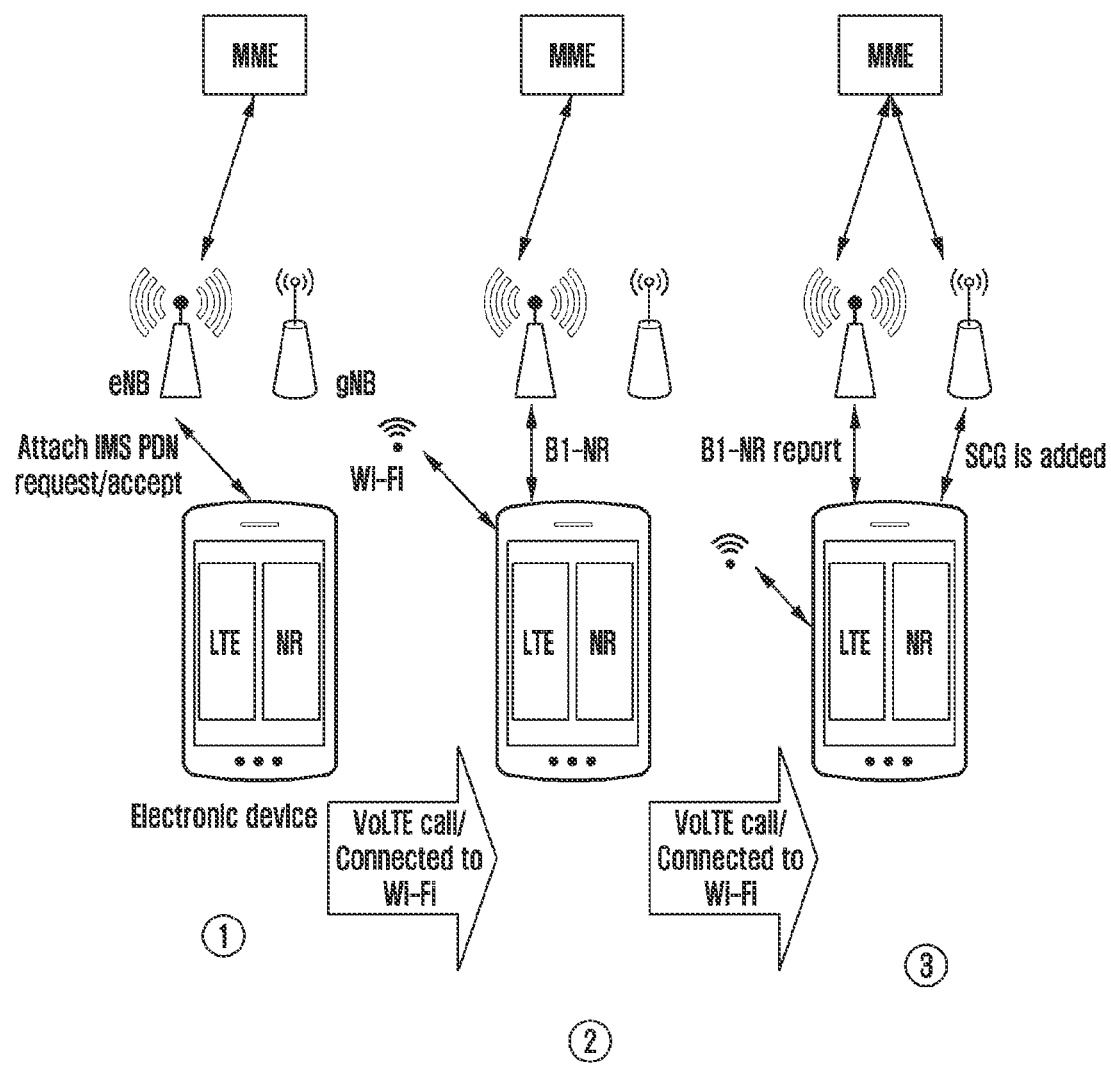
FIG. 1 illustrates a schematic diagram of a conventional method of no data activity or minimal data activity or when mobile data is turned-off or when wireless fidelity (Wi-Fi) connection occurs in the electronic device, while performing NR measurements.
Figure 2A:
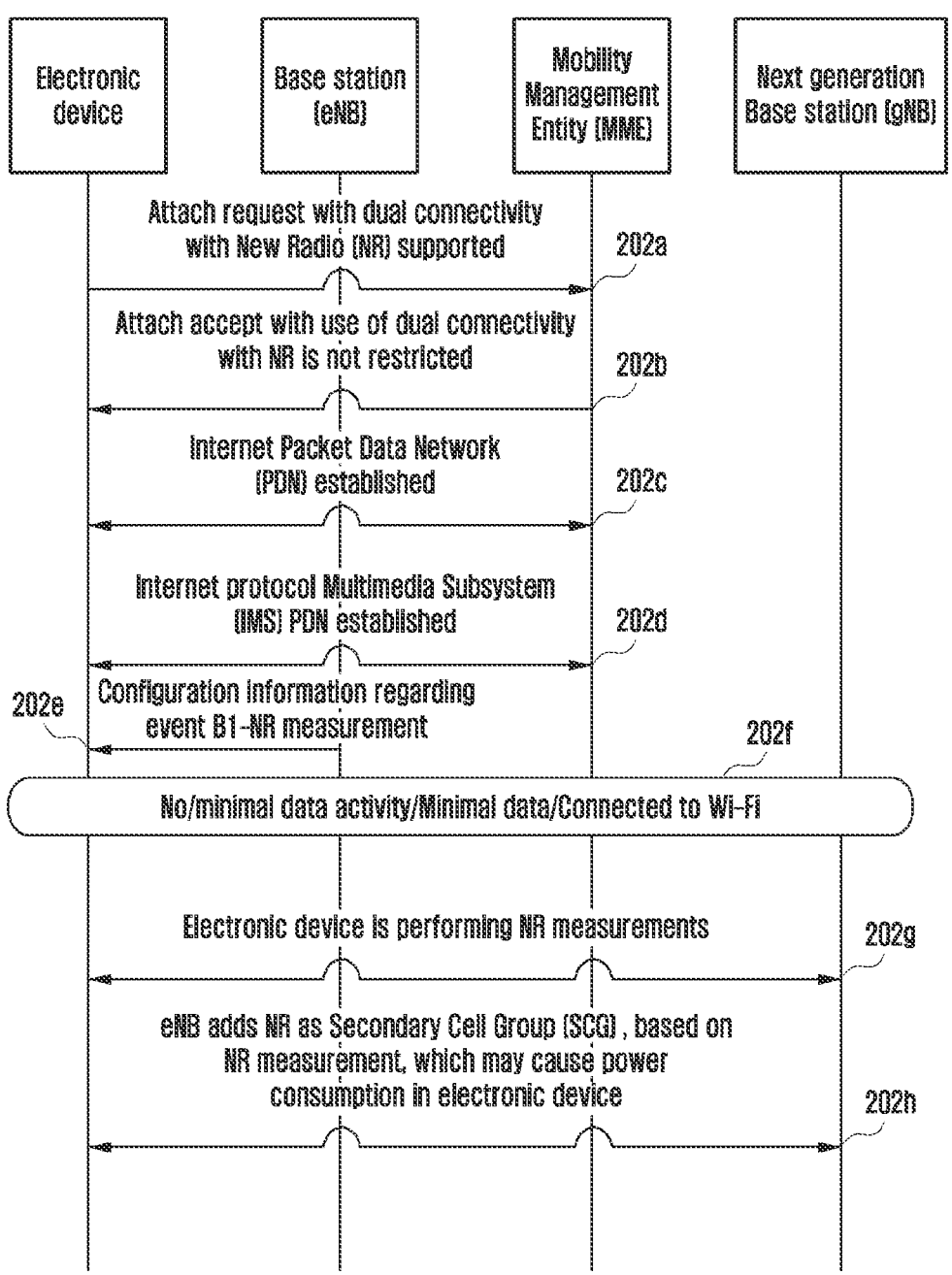
FIG. 2A illustrates a conventional method of no/minimal data activity or mobile data is turned off or Wi-Fi connection is on in the electronic device while performing NR measurements.
Figure 2B:
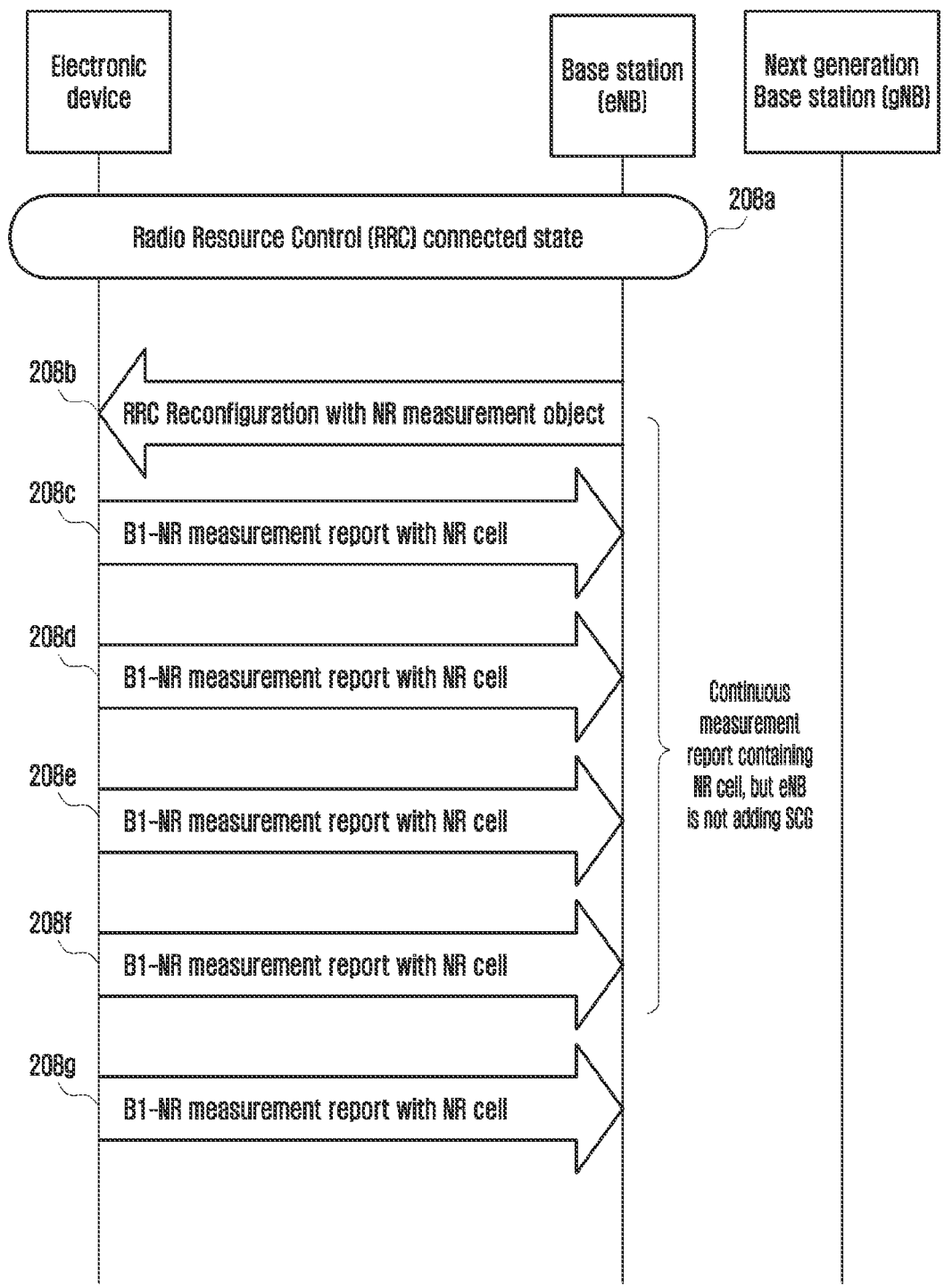
FIG. 2B illustrates a conventional method in which the SCG is not added by the base station even after multiple B1-NR measurement reports are sent by the electronic device.
Figure 2C:
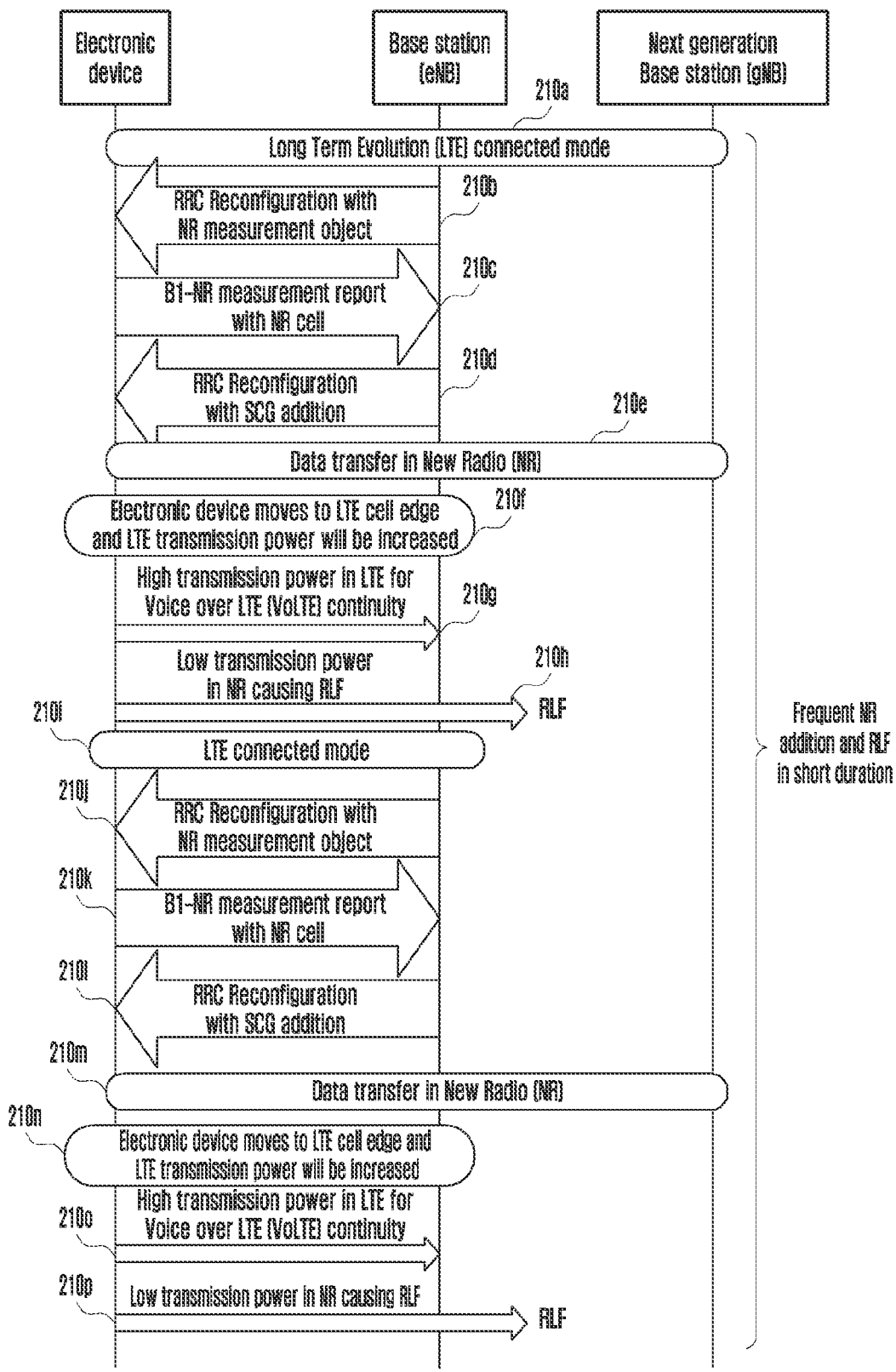
FIG. 2C illustrates a conventional method in which there is frequent NR-RLF due to the transmission power limitation issue in the electronic device.
Figure 2D:
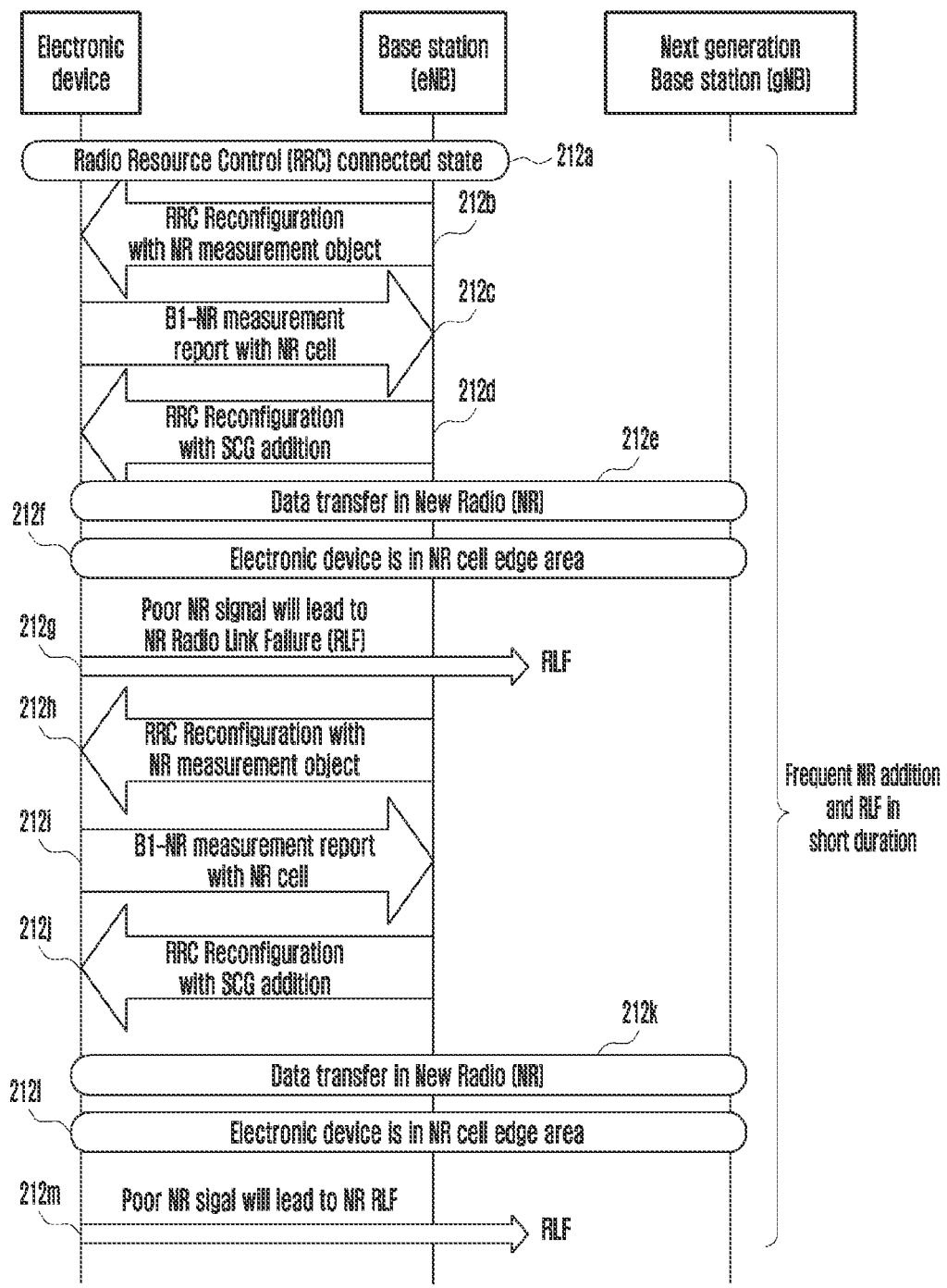
FIG. 2D illustrates a conventional method in which there is frequent NR-RLF due to the NR cell edge area of the electronic device.
Figure 2E:
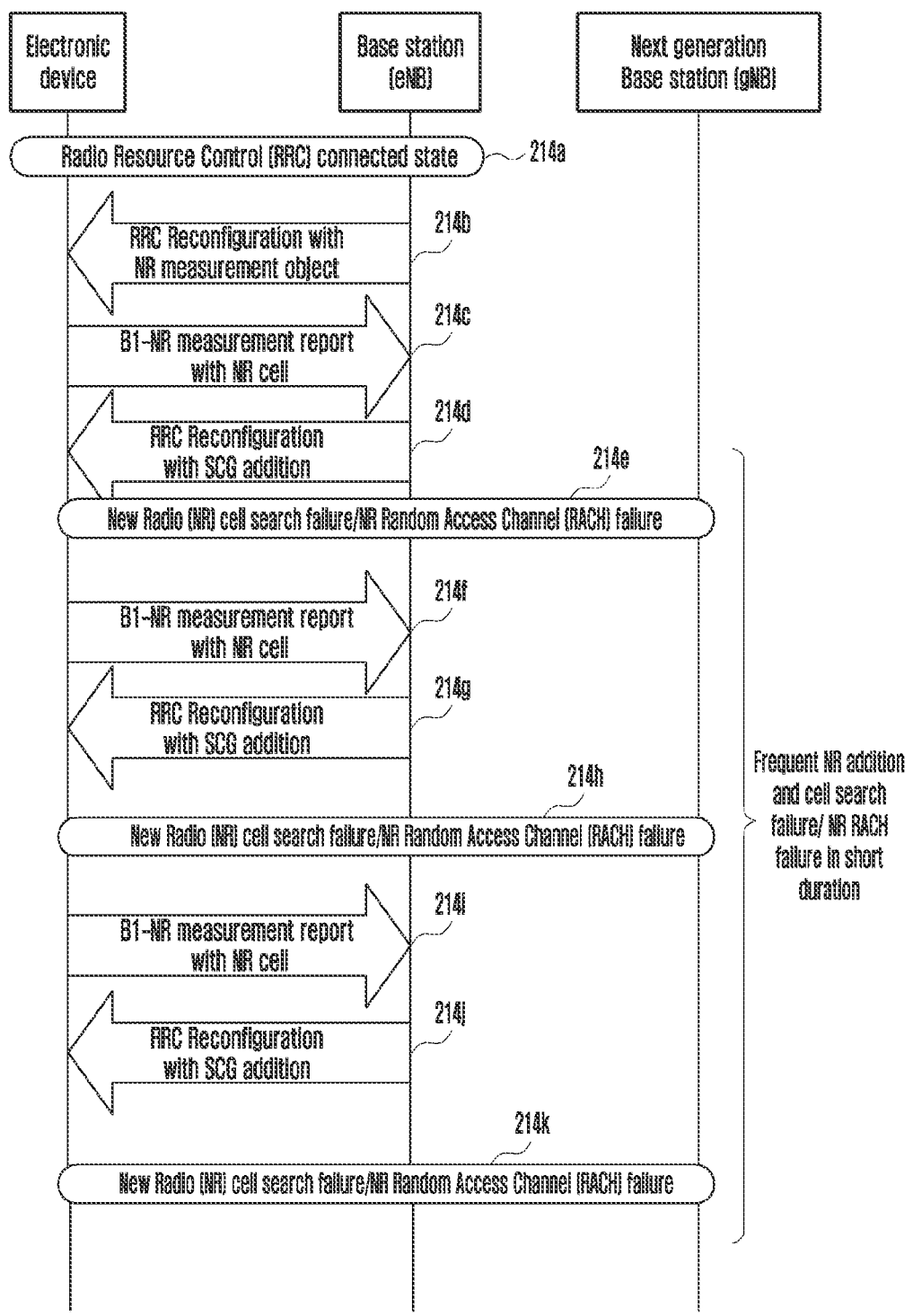
FIG. 2E illustrates a conventional method in which there is frequent NR sync failure or NR RACH failure.

Hereinafter, embodiments of the disclosure will be described in detail with reference to accompanying drawings. In the disclosure, embodiments are described in the drawings and a related detailed description is set forth, but this is not intended to limit the embodiments of the disclosure. Descriptions of well-known functions and constructions are omitted for the sake of clarity and conciseness.

In the present document, the word "exemplary" may be used herein to indicate "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof will be shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup, device, or method. In other words, one or more elements in a system or apparatus proceeded by "comprises . . . a" does not, without more constraints, preclude the existence of other elements or additional elements in the system or method.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

When a single device or article is described herein, it is apparent that more than one device/article may be used in place of a single device/article. Similarly, where more than one device or article is described herein, it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments do not need to include the device itself.

The terms "comprising," "having," "containing," and "including," and other similar forms are intended to be equivalent in meaning and be open-ended in that an item or items following any one of these terms is not meant to be an exhaustive listing of such item or items, or meant to be limited to only the listed item or items. It is noted that as used herein and in the appended claims, the singular forms "a," "an," and "the" include plural references unless the context clearly dictates otherwise.

Although the embodiments herein are described using NR communication, they are mere examples. Therefore, the embodiments herein are applicable to any other communication system such as LTE advanced (LTE-A) network, a 5G network, a 5G core (5GC) network, or the like. The communication system may include a RAN and a core network (CN). The RAN may include at least one base station such as next-generation base station. The RAN may be an evolved universal terrestrial RAN (E-UTRAN) or an NR RAN (or 5G RAN). The CN may be an EPC network or the 5GC network, for example.

Disclosed herein are methods and systems for managing NR communication in an electronic device. A network management system associated with the electronic device may receive from a base station, a configuration information for an event B1-NR measurement. The event B1-NR for measurement is configured or configuration information is sent to the electronic device, by the base station when an NR cell is to be added for dual connectivity between multiple RATs. When the event B1-NR criteria is met, it is implied that measurement values of the NR neighbor cell has become greater than the configured threshold. The electronic device may trigger B1-NR measurement report for the event B1-NR measurement when B1-NR criteria is met. Based on the B1-NR measurement report, the base station via a next generation base station adds NR cell for the dual connectivity. The configuration information may indicate a trigger threshold value for triggering the electronic device to transmit a B1-NR measurement report. The event B1-NR may be randomly configured by the base station or may be configured based on LTE/NR signal strength.

The B1-NR measurement report is transmitted to the base station to add an SCG associated with an NR, by the base station. Based on the received configuration information, the network management system may monitor at least one condition of the electronic device. The at least one condition of the electronic device may include, but is not limited to, no mobile data activity, minimal mobile data activity, disabled mobile data, connection to Wi-Fi network, and frequent NR connection failure during the addition of the SCG. The SCG can be an NR RAT. The network management system may periodically monitor the at least one condition of the electronic device for any change in the at least one condition. Based on monitoring the at least one condition, the network management system may restrict of at least one of an NR capability and NR measurements of the electronic device, when the monitored at least one condition of the electronic device is satisfied.

A description of an embodiment with several components in communication with each other does not imply that all such components are required. Rather, a variety of optional components are described to illustrate the possible embodiments.

In the following detailed description, reference is made to the accompanying drawings that show, by way of illustration, embodiments in which the disclosure may be practiced. These embodiments are described in sufficient detail to enable those skilled in the art to practice the disclosure, and it is to be understood that other embodiments may be utilized and that changes may be made without departing from the scope of the present disclosure.

Figure 3:
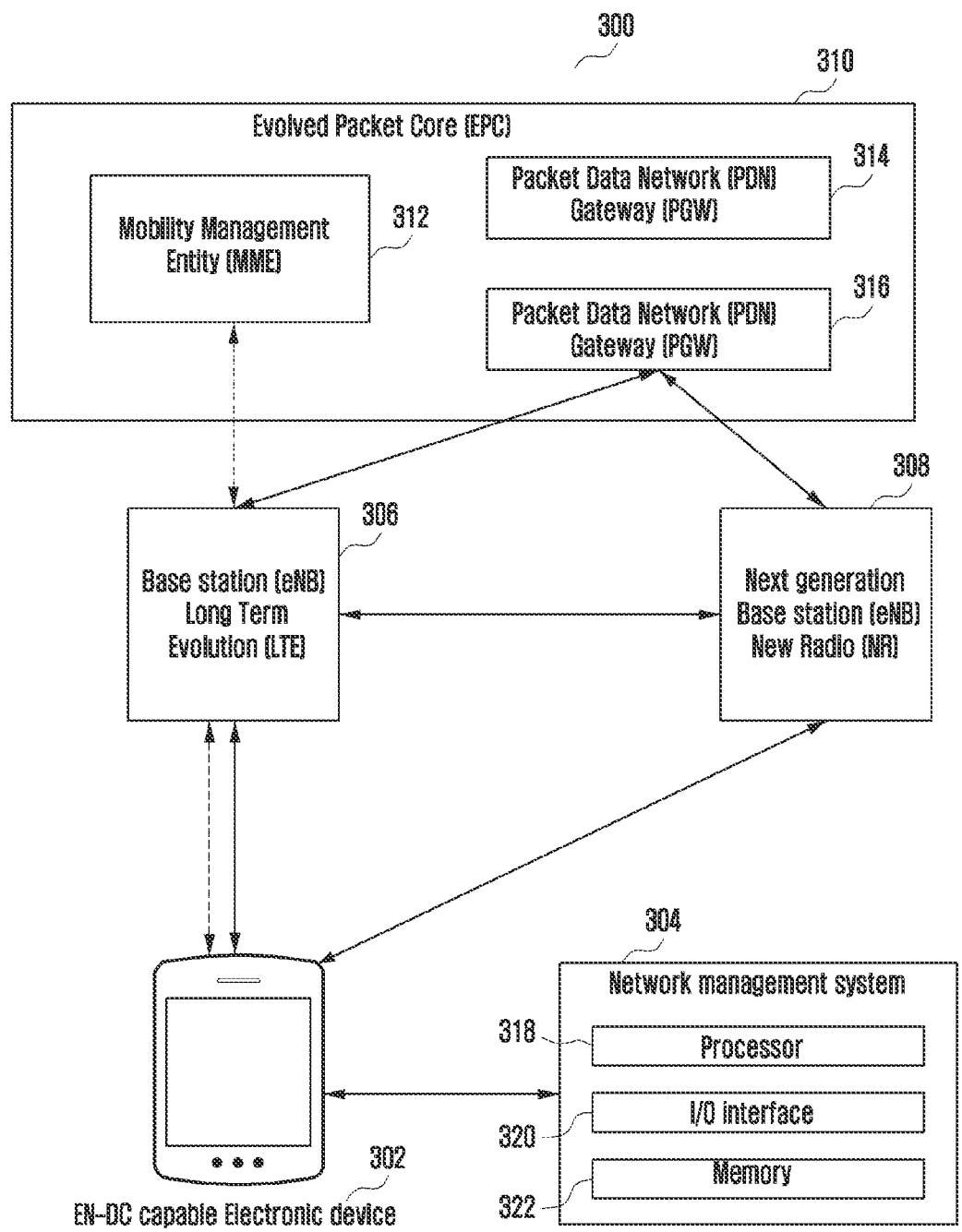
FIG. 3 illustrates architecture for managing NR communication in an electronic device according to an embodiment.

FIG. 3 illustrates architecture 300 for managing NR communication in an electronic device according to an embodiment.

The architecture 300 includes an electronic device 302, a network management system 304 associated with the electronic device 302, a base station 306 (eNB), a gNB 308, and an EPC 310. The network management system 304 may be configured within the electronic device 302. The electronic device 302 may include, but is not limited to, a mobile phone, a cellular phone, a smartphone, a tablet, a phablet, a smartwatch, a laptop, a notebook, an e-reader, and the like. The network management system 304 may be associated with the electronic device 302 via a communication network. The communication network may be at least one of a wired communication network and a wireless communication network. The EPC 310 further includes a mobility management entity (MME) 312, a PDN gateway (PGW) 314, and an SGW 316. The base station 306 may communicate with the MME 312 and/or SGW 316 via a signaling interface. The base station 306 may communicate with the next generation base station 308 via a network interface. The EPC 310 determines whether the electronic device 302 is authorized for DC access during an attach procedure. The EPC 310 may be responsible for providing converged voice and data on a 4G LTE network. The EPC 310 may also support the switching of bearers between the base station 306 and the next-generation base station 308. The MME 312 may be responsible for managing session states and authenticates and tracks the electronic device 302 across network coverage of the base station 306. The PGW 314 may act as an interface between the base station 306 and the next-generation base station 308 and may manage quality of service (QoS). The SGW 316 may be responsible for routing data packets to the electronic device 302 through the base station 306.

The network management system 304 may include a processor 318, an input/output (I/O) interface 320 and a memory 322. The I/O interface 320 may be configured to receive inputs such as turn-off mobile data, turn-on mobile data, connect/disconnect to a Wi-Fi network, and perform VoLTE call, from a user of the electronic device 302. The network management system 304 may determine a minimal mobile data activity and no mobile data activity in the electronic device 302 based on information from at least one of a packet data convergence protocol (PDCP) entity in the electronic device 302, a medium access control layer—buffer status report (MAC—BSR) of the electronic device 302, and the like.

The network management system 304 associated with the electronic device 302 is configured to receive from the base station 306, a configuration information for an event B1-NR measurement. The configuration information may indicate a trigger threshold value for triggering the electronic device 302 to transmit a B1-NR measurement report. The configuration information, such as an RRC connection reconfiguration message, may include information on type of event the electronic device 302 has to report and information type of measurements to perform B1-NR measurements.

The B1-NR measurement report is requested by the base station 306 from the electronic device 302 for adding an NR as an SCG to the electronic device 302, if the electronic device 302 attaches to the base station 306 as an EUTRA NR-DC (EN-DC) capable electronic device 302. Based on receiving the configuration information for the event B1-NR measurement from the base station 306, the network management system 304 is configured to periodically monitor at least one condition of the electronic device 302. The at least one condition of the electronic device 302 includes at least one of, but not limited to, no mobile data activity, minimal mobile data activity, disabled mobile data, connection to a Wi-Fi network, and frequent NR connection failure during addition of the SCG. The frequent NR connection failure includes at least one of, but not limited to, NR RLF, NR synchronization failure, NR RACH failure, and sending NR measurement report without NR measurements to the base station 306. Based on the monitoring, the network management system 304 restricts at least one of an NR capability and NR measurements of the electronic device 302, when the at least one condition of the electronic device 302 is satisfied. When the at least one condition of the electronic device 302 is not satisfied, the network management system 304 enables at least one of the NR capabilities and the NR measurements of the electronic device 302. Once the NR capability and the NR measurements of the electronic device 302 are enabled, the network management system 304 is configured to send the B1-NR measurement report to the base station 302 for adding the SCG.

Upon determining NR connection failure for a first time during the addition of the SCG, the network management system 304 is configured to disable the NR capability of the electronic device for a first pre-defined time. The first pre-defined time is iteratively increased upon each subsequent NR connection failure. For example, the first pre-defined time can be a duration of 'X' minute and after the expiration of X minutes, the network management system 304 may enable the NR capability of the electronic device 302. If the NR connection failure re-occurs, such as five NR connection failures occur in 1 minute on the same NR cell, then the network management system 304 may disable NR capability of the electronic device 302, more aggressively for 2× duration, as it determines that the NR connection failures are still existing in the same NR cell. Similarly, if NR connection failures continues, then the NR capability of the electronic device 302 is disabled for 3× duration and then 4×, and so on. The network management system 304 is configured to restrict the NR measurements, thereby the B1-NR measurement report is not transmitted to the base station 306, and in response, the NR is not added as the SCG by the base station 306.

The network management system 304 is configured to disable the NR capability of the electronic device 302 for a first pre-defined time upon determining for the first time, at least one of, the mobile data is disabled, there is no mobile data activity, there is minimal mobile data activity, and there is a connection to a Wi-Fi network. The first pre-defined time is iteratively increased upon each determination of at least one of the mobile data being disabled, no mobile data activity, minimal mobile data activity, and the connection to the Wi-Fi network. The network management system 304 is configured to determine whether the SCG associated with the NR is already added by the base station 306 via the next generation base station 308. To cause the base station 306 to release the already added SCG, the network management system 304 determines whether a configuration information for an event A2-NR measurement is received from the next generation base station 308. The event A2 is triggered for NR cell measurement and is configured or configuration information is sent to the electronic device, by the next generation base station 308. The event A2-NR measurement is configured to monitor the condition of the NR serving cell. When the A2-NR event criteria is met then, it implies that measurement values of the NR serving cell has become less than configured threshold. Based on the A2-NR measurement report from the electronic device 302, the next generation base station 308 can decide to release serving cell or configures other NR events such as A3 (measurement values of Neighbor cell becomes offset better than measurement values of serving cell) or A5 (Serving becomes worse than threshold 1 and neighbor becomes better than threshold 2). If the configuration information for an event A2-NR measurement is received from the next generation base station 308, the network management system 304 is configured to send a poor NR cell measurement in A2-NR measurement report to the next generation base station 308. If the configuration information for the event A2-NR measurement is not received from the next generation base station 308, and if the SCG is not released by the next generation base station 308, network management system 304 is configured to notify the next generation base station 308, regarding the disabled NR capability of the electronic device 302 along with an indication of the SCG failure, causing the next generation base station 308 to release the already added SCG. Furthermore, the network management system 304 is configured to restrict the NR measurements. As such, the B1-NR measurement report is not transmitted to the base station 306, and in response, the NR is not added as the SCG by the base station 306.

The network management system 304 may be further configured to configure multiple NR frequencies for the event B1-NR measurement. The network management system 304 is configured to restrict the NR measurements for at least of, at least one NR frequency of the multiple frequencies and at least one NR cell with frequent NR connection failure. The network management system 304 is configured to perform the NR measurements for the at least one of the remaining NR frequencies of the multiple NR frequencies and remaining NR cells, other than the restricted at least one NR frequency and at least one NR cell.

The network management system 304 is configured to determine whether the electronic device 302 is in at least one of an LTE cell edge area and a NR cell edge area. If the electronic device is in either the LTE cell edge area or the NR cell edge area, the network management system 304 is configured to allocate greater transmission power to LTE communication of the electronic device 302 as compared to NR communication of the electronic device 302. The network management system 304 is configured to monitor the NR RLF. The NR capability of the electronic device 302 is disabled for the first pre-defined time when the occurrence of NR RLF is detected while monitoring the NR RLF for a first time. The NR capability of the electronic device 302 is disabled when at least one of a NR RLF failure count of the monitored NR RLF is greater than a pre-defined count and a NR RLF failure time is greater a second pre-defined time. The first pre-defined time is iteratively increased upon each subsequent NR RLF.

The network management system 304 is configured to continuously reconfigure an RRC connection, with the SCG addition. If the RRC connection is reconfigured for at least one of an RRC reconfiguration count greater than the pre-defined count and a NR Synchronization or RACH failure time greater than the second pre-defined time, the network management system 304 is configured to disable the NR capability of the electronic device 302 for a first pre-defined time. The network management system 304 is configured to continuously transmit the NR measurement report to add SCG. When the NR measurement report is transmitted for a report transmission count greater than a pre-defined count or SCG addition time greater than a second pre-defined time, the network management system 304 is configured to disable the NR capability of the electronic device 302 for the first pre-defined time.

Figure 4:
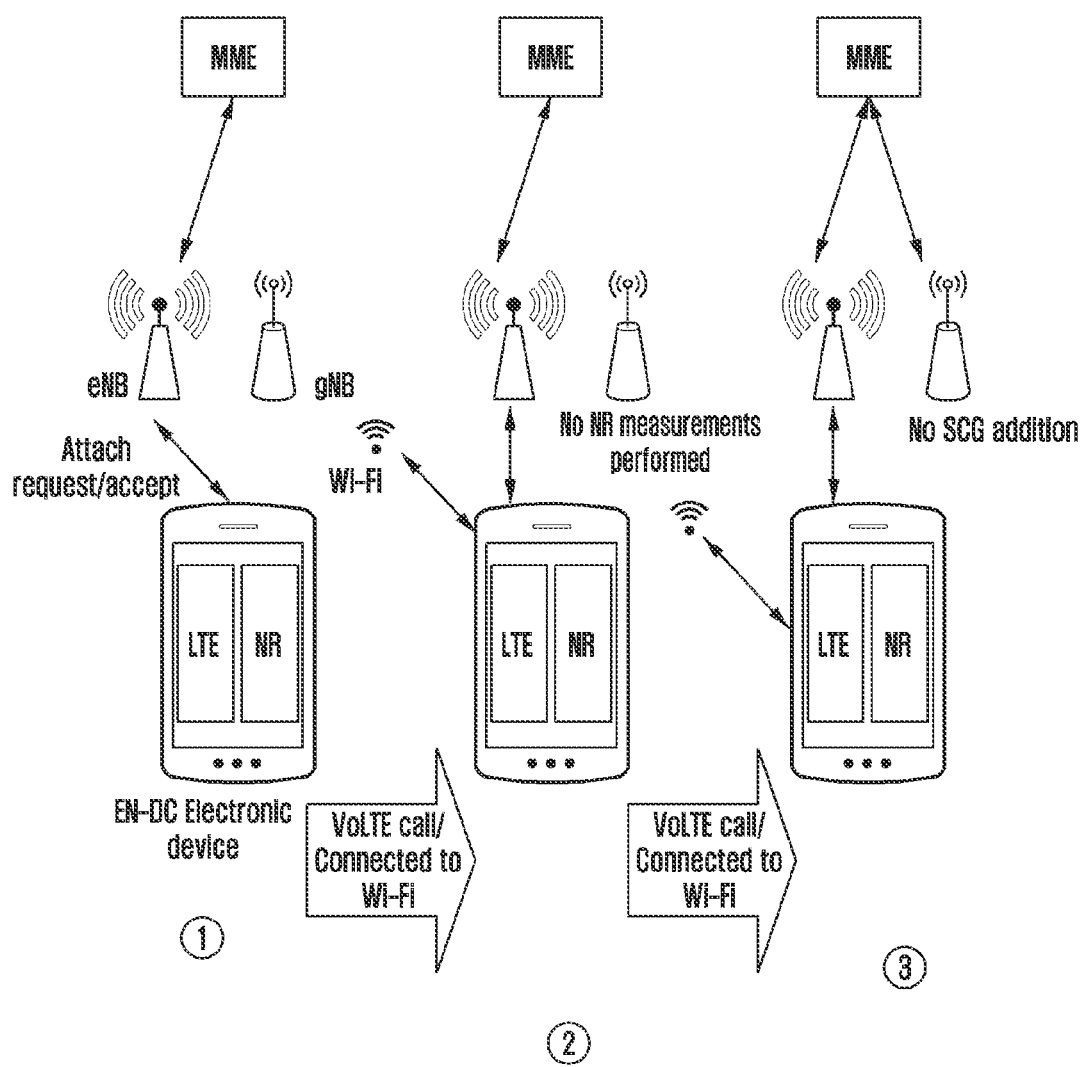
FIG. 4 illustrates a schematic diagram of when there is no/minimal data activity or mobile data is turned-off or Wi-Fi is connected in the electronic device is observed, when event B1-NR configuration is received according to an embodiment.

FIG. 4 illustrates a schematic diagram of when there is no/minimal data activity or mobile data is turned-off or Wi-Fi is connected in the electronic device is observed, when event B1-NR configuration is received according to an embodiment.

At step 1, the electronic device 302 sends attach request including dual connectivity with NR supported, to the base station 306, and the attach request may be accepted by the base station 306. An IMS PDN may be established between the base station 306 and the electronic device 302. Subsequently, VoLTE call may be started. Simultaneously, the base station 306 may transmit the configuration information for the event B1-NR measurement, to the electronic device 302, even though the SCG addition is not required for VoLTE call.

At step 2, the network management system 304 configured in the electronic device 302 may determine that there is no/minimal data activity condition or mobile data is turned-off in the electronic device 302, and in response the network management system 304 may disable NR capability and restrict NR measurements. At step 3, the B1-NR measurement report is not sent to the base station 306, and in response, the base station 306 does not add the SCG.

When the electronic device 302 is connected to the Wi-Fi network in FIG. 4. Steps 1 and 3 are the same as described when there is no/minimal data activity or mobile data is turned-off in the electronic device 302. At step 2, the network management system 304 configured in the electronic device 302 may determine that the electronic device 302 is connected to the Wi-Fi network, and in response the network management system 304 may disable NR capability and restrict NR measurements. The SCG addition may not be required, if the electronic device 302 is connected to Wi-Fi network.

Figure 5A:
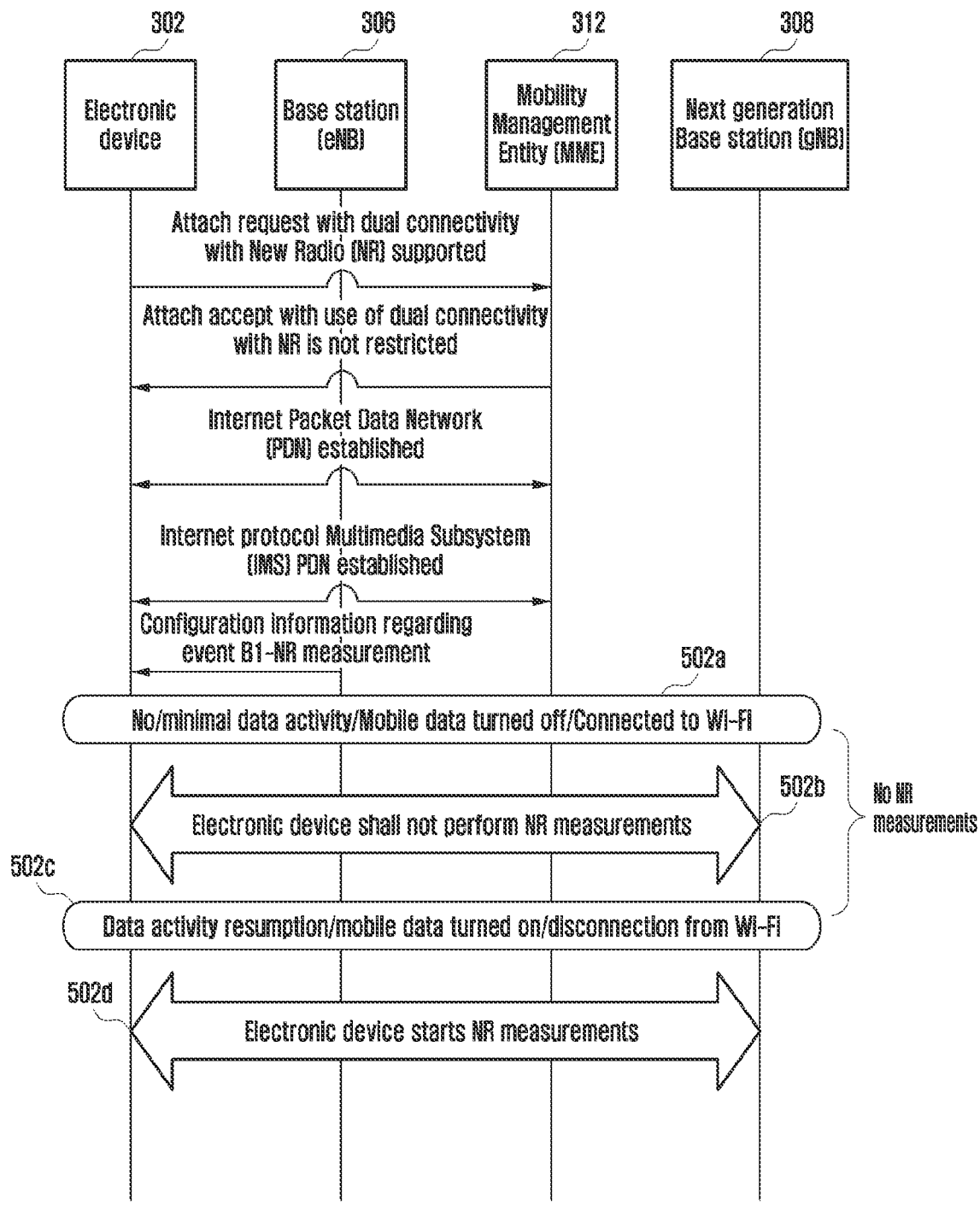
FIG. 5A illustrates a sequence diagram of a method of no/minimal data activity or mobile data is turned off or Wi-Fi is connected in the electronic device, when event B1-NR configuration is received according to an embodiment.

FIG. 5A illustrates a sequence diagram of a method of no/minimal data activity or mobile data is turned off or Wi-Fi is connected in the electronic device, when event B1-NR configuration is received according to an embodiment.

The attach request, attach accept, PDN establishment, and IMS PDN establishment steps may be performed between the electronic device 302 and the MME 312 according to a pre-defined procedure. Subsequently, the base station 306 may send configuration information to the electronic device 302, to perform NR measurements and transmit the B1-NR measurement report. At step 502*a*, the network management system 304 configured in the electronic device 302 may monitor and determine no/minimal data activity or mobile data is turned-off or Wi-Fi is connected in the electronic device 302. At step 502*b*, the network management system 304 configured in the electronic device 302 may not perform the NR measurements of the next generation base station 308. At step 502*c*, the network management system 304 configured in the electronic device 302 may detect that the data activity is resumed or mobile data is turned on or Wi-Fi is disconnected and data activity is performed using the mobile data in the electronic device 302. At step 502*d*, the network management system 304 configured in the electronic device 302 may enable the NR measurements and start the NR measurement of the next generation base station 308.

Figure 5B:
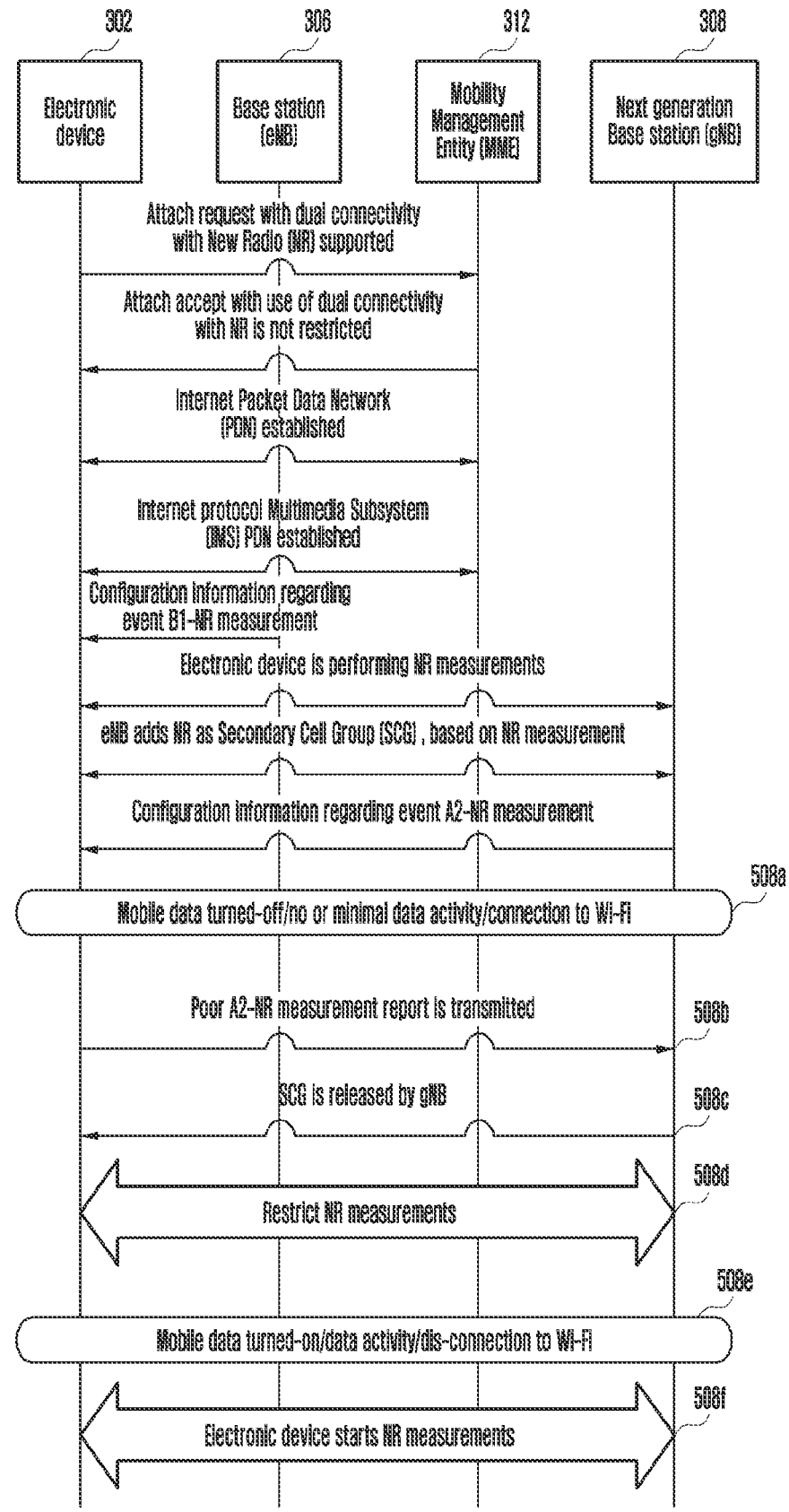
FIG. 5B illustrates a sequence diagram of a method when mobile data is turned off, there is no/minimal data activity and the Wi-Fi network is connected to the electronic device, after the SCG addition by the base station according to an embodiment.

FIG. 5B illustrates a sequence diagram of a method when mobile data is turned off, there is no/minimal data activity and the Wi-Fi network is connected to the electronic device, after the SCG addition by the base station according to an embodiment.

The attach request, attach accept, and IMS PSN establishment steps may be performed between the electronic device 302 and the MME 312 according to a pre-defined procedure. Subsequently, the base station 306 may send configuration information to the electronic device 302, to perform NR measurements and transmit the B1-NR measurement report. The electronic device 302 may perform the NR measurements of the next generation base station 308 and the SCG is added as usual by the base station 306. Subsequently, a configuration information for an event A2-NR measurement is received by the electronic device 302, from the gNB 308. An A2-NR measurement report is requested via configuration information by the next generation base station 308 to know the status/signal strength of serving cell of the next generation base station 308 to the electronic device 302. At step 508a, the network management system 304 configured in the electronic device 302 may determine at least one condition of the electronic device 302, such as mobile data is turned off, no/minimal data activity, and connection to the Wi-Fi network in the electronic device 302, after addition of the SCG. The network management system 304 configured in the electronic device 302 tries to release the added SCG if monitored at least one condition of the electronic device 302, such as mobile data is turned off, no/minimal data activity, or connection to the network in the electronic device 302 is satisfied. At step 508b, the network management system 304 configured in the electronic device 302 may transmit a poor A2-NR measurement report for causing the next generation base station 308 to release the SCG. At step 508c, the next generation base station 308 may release the SCG based on a poor A2-NR measurement report. Subsequently, at step 508d, the NR measurements are restricted by the network management system 304 configured in the electronic device 302 after causing the next generation base station 308 to release the SCG. At step 508e, the network management system 304 configured in the electronic device 302 may detect at least one condition of the electronic device 302, such as mobile data being turned on, data activity occurs, or disconnection to the Wi-Fi network in the electronic device. At step 508f, the network management system 304 configured in the electronic device 302 may enable the NR measurements and start the NR measurement of the next generation base station 308.

Figure 5C:
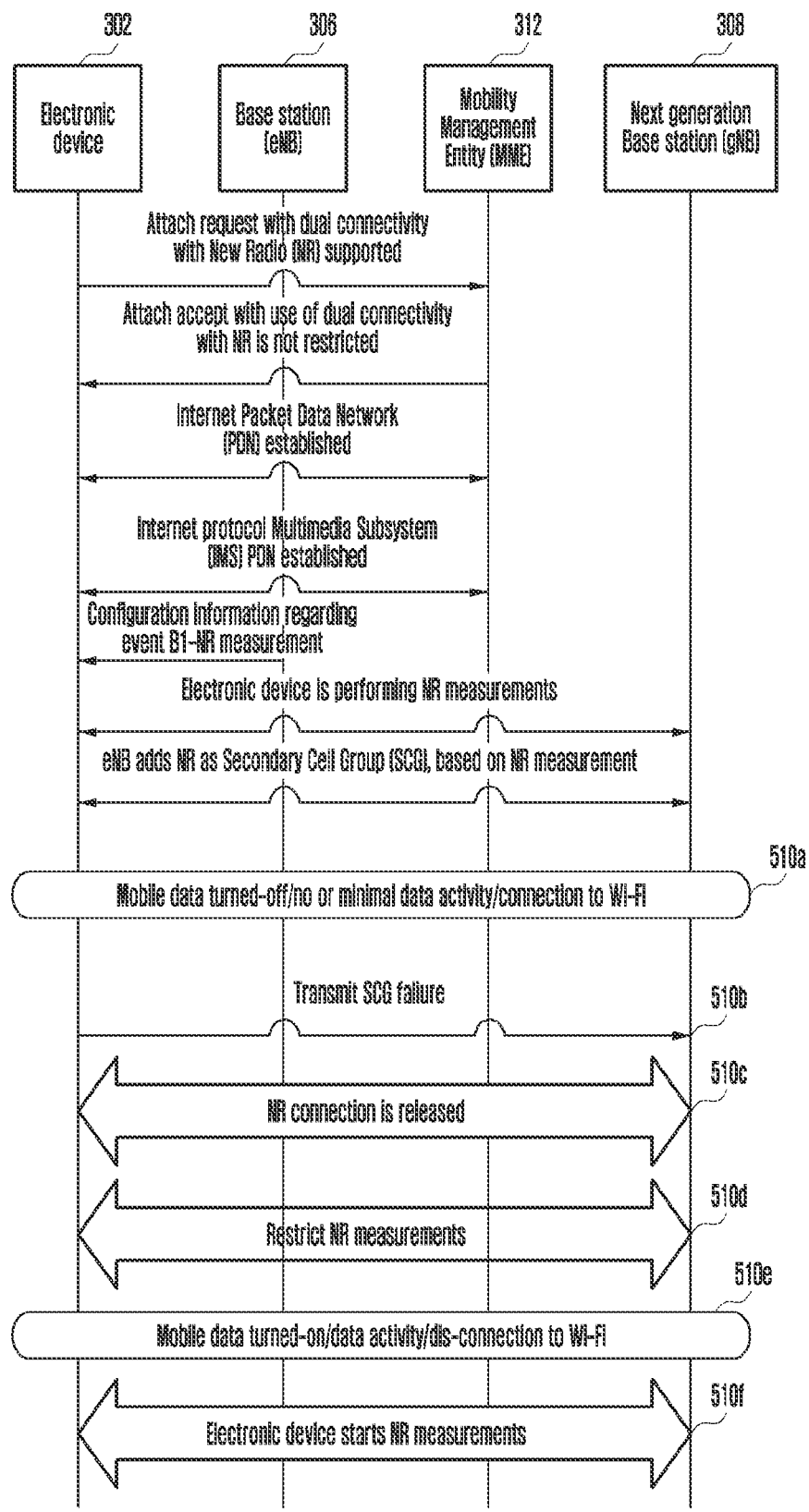
FIG. 5C illustrates a sequence diagram of a method when mobile data is turned off, no/minimal data activity is observed and the Wi-Fi network is connected to the electronic device, after the SCG addition, and configuration information for an event A2-NR measurement is not received from the next generation base station according to an embodiment.

FIG. 5C illustrates a method when mobile data is turned off, no/minimal data activity is observed and the Wi-Fi network is connected to the electronic device, after the SCG addition, and configuration information for an event A2-NR measurement is not received from the next generation base station according to an embodiment.

The attach request, attach accept, and IMS PSN establishment steps, may be performed between the electronic device 302 and the MME 312 according to a pre-defined procedure. Subsequently, the base station 306 may send configuration information to the electronic device 302, to perform NR measurements and transmit the B1-NR measurement report. The electronic device 302 may perform the NR measurements of the next generation base station 308 and the SCG is added as usual by the base station 306. The configuration information regarding the event A2-NR measurement may not be received from the next generation base station 308.

At step 510a, the network management system 304 configured in the electronic device 302 may determine at least one condition of the electronic device 302, such as mobile data is turned off, there is no/minimal data activity, and connection to the Wi-Fi network in the electronic device, after addition of the SCG. The network management system 304 configured in the electronic device 302 tries to release the added SCG. At step 510b, the network management system 304 configured in the electronic device 302 may transmit an SCG failure, for causing the next generation base station 308 to release the SCG. At step 510c, the next generation base station 308 may release the NR connection. Subsequently, at step 510d, the NR measurements are restricted by the network management system 304 configured in the electronic device 302 after releasing the NR connection. At step 510e, the network management system 304 configured in the electronic device 302 may detect at least one condition of the electronic device 302, such as mobile data being turned on, data activity occurs, or disconnection to the Wi-Fi network in the electronic device. At step 510f, the network management system 304 configured in the electronic device 302 may enable the NR measurements and start the NR measurement of the next generation base station 308.

Figure 6:
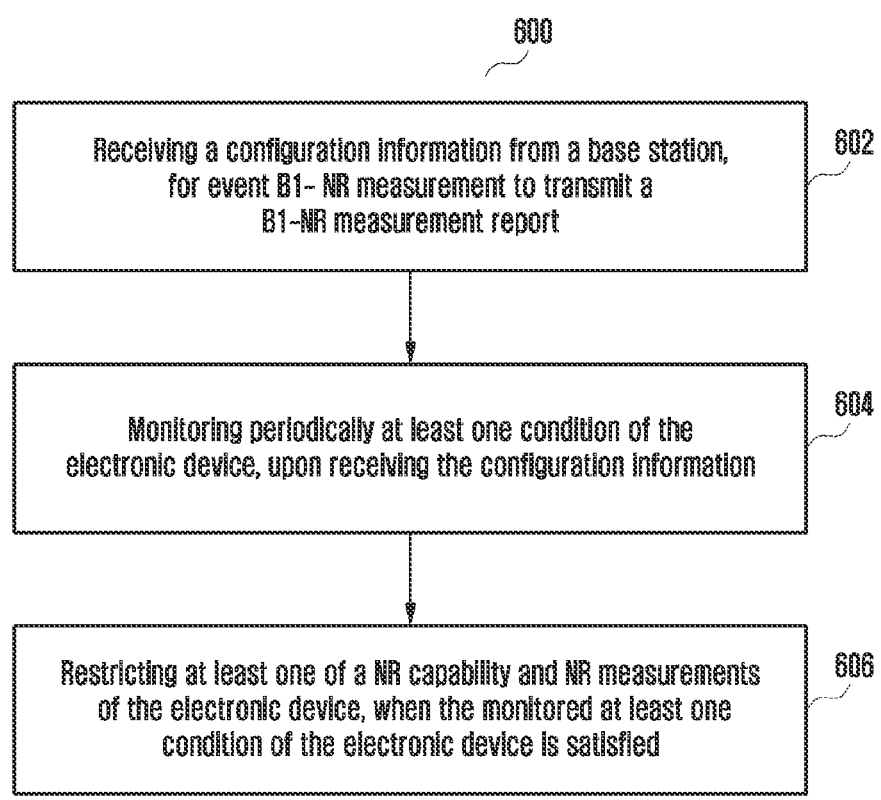
FIG. 6 illustrates a method for managing NR communication in the electronic device, according to an embodiment.

FIG. 6 illustrates a method for managing NR communication in the electronic device 302, according to an embodiment.

As illustrated in FIG. 6, the method 600 includes one or more blocks illustrating a method for managing NR communication in the electronic device 302. The method 600 may be described in the general context of computer-executable instructions, including routines, programs, objects, components, data structures, procedures, modules, and functions, which perform functions or implement abstract data types.

The order in which the method 600 is described is not intended to be construed as a limitation, and any number of the described method blocks can be combined in any order to implement the method 600. Additionally, individual blocks may be deleted from the methods without departing from the spirit and scope of the subject matter described herein. Furthermore, the method 600 can be implemented in any suitable hardware, software, firmware, or combination thereof.

At step 602, the method 600 may include receiving from a base station, a configuration information for an event B1-NR measurement. The configuration information may indicate a trigger threshold value for triggering the electronic device to transmit a B1-NR measurement report. The B1-NR measurement report is transmitted to add an SCG associated with an NR by the base station 306.

At step 604, the method 600 may include monitoring periodically at least one condition of the electronic device, upon receiving the configuration information. The at least one condition of the electronic device comprises, no mobile data activity, minimal mobile data activity, disabled mobile data, connection to network, and frequent NR connection failure during addition of the SCG.

At step 606, the method 600 may include restricting at least one of the NR capability and NR measurements of the electronic device 302, when the monitored at least one condition of the electronic device 302 is satisfied.

Figure 7A:
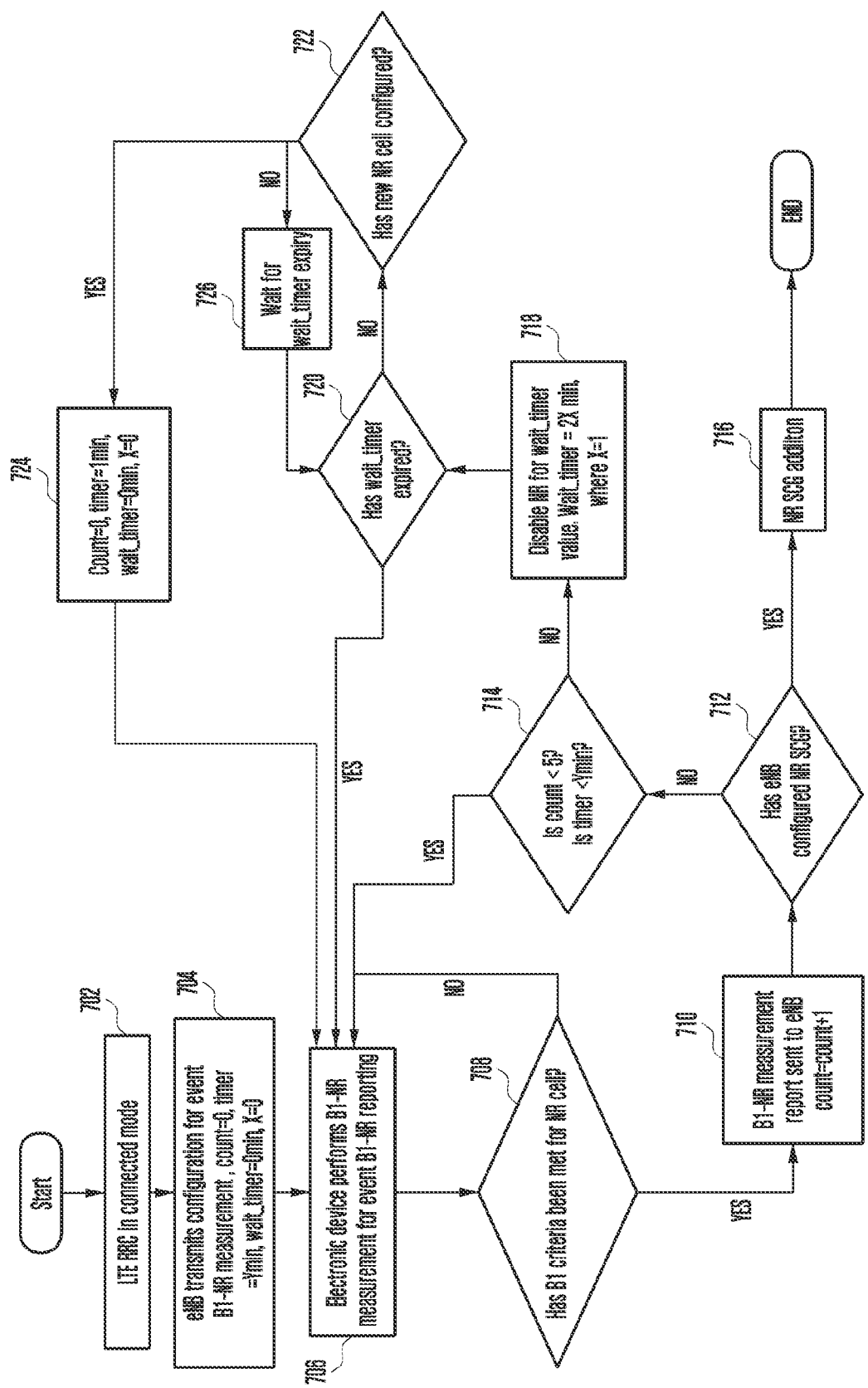
FIG. 7A illustrates a method for disabling NR if frequent measurement report is transmitted to base station without the SCG addition according to an embodiment.

FIG. 7A illustrates a method for disabling NR if frequent measurement report is transmitted to base station 306 without SCG addition according to an embodiment.

At step 702, the electronic device 302 is in RRC connected mode with base station 306. At step 704, the base station 306 transmits configuration information for event B1-NR measurement to the electronic device 302. A counter for a report transmission count, a wait timer to wait for a first predefined time, a timer to watch a second pre-defined time ('Y' minutes), an iterative factor 'X' is assigned by the network management system 304 and reset to zero. At step 706, the electronic device 302 performs B1-NR measurements. At step 708, the electronic device 302 determines whether the B1 criteria is met for the NR cell. The base station 306 indicates a trigger threshold value for triggering the electronic device to transmit a B1-NR measurement report. Based on the trigger threshold value, the electronic device 302 determines whether the B1 criteria are met for the NR cell. At step 710, the B1-NR measurement report is transmitted to the base station 306, if the B1 criteria is met for the NR cell, and if the criteria for the NR cell is not met, step 706 is repeated. If the B1-NR measurement report is transmitted to the base station 306, the counter for the report transmission count is incremented by '1'.

At step 712, the electronic device 302 via the network management system 304 determines whether the base station 306 has configured the NR SCG. If the base station 306 has configured NR SCG at step 712, then at step 716, the NR SCG is added. If the NR SCG is not configured, then at step 714, the counter for the report transmission count is compared with a pre-defined count, such as a 5 count, and the timer is compared with the second pre-defined time, such as Y minutes. If the pre-defined count and the second pre-defined time is less than the 5 count and Y minutes respectively, step 706 is repeated. If the pre-defined count and the second pre-defined time is greater than the 5 count and Y minutes respectively, at step 718, the NR capability of the electronic device 302 is disabled for the wait timer of the first predefined time. The wait timer may be iteratively increased if the B1-NR measurement report is transmitted for greater than 5 counts for more than two or more times (i.e. 10 or more reports) or the timer is expired more than once (greater than Y minutes) after receiving event B1-NR configuration.

At step 720, the electronic device 302 via the network management system 304 determines whether the wait timer has expired. If the wait timer has expired, step 706 is repeated, and if not, at step 722, the network management system 304 determines whether the new NR cell is configured by the base station 306. At step 724, the counter for the report transmission count, wait timer to wait for the first predefined time, the timer to watch the second pre-defined time ('Y' minutes), and the iterative factor 'X' are reset to zero by the network management system 304, if the new NR cell is configured, and step 706 is repeated to perform B1-NR measurement and to add the SCG. At step 726, the network management system 304 waits for wait timer expiration, if the new NR cell is not configured.

Figure 7B:
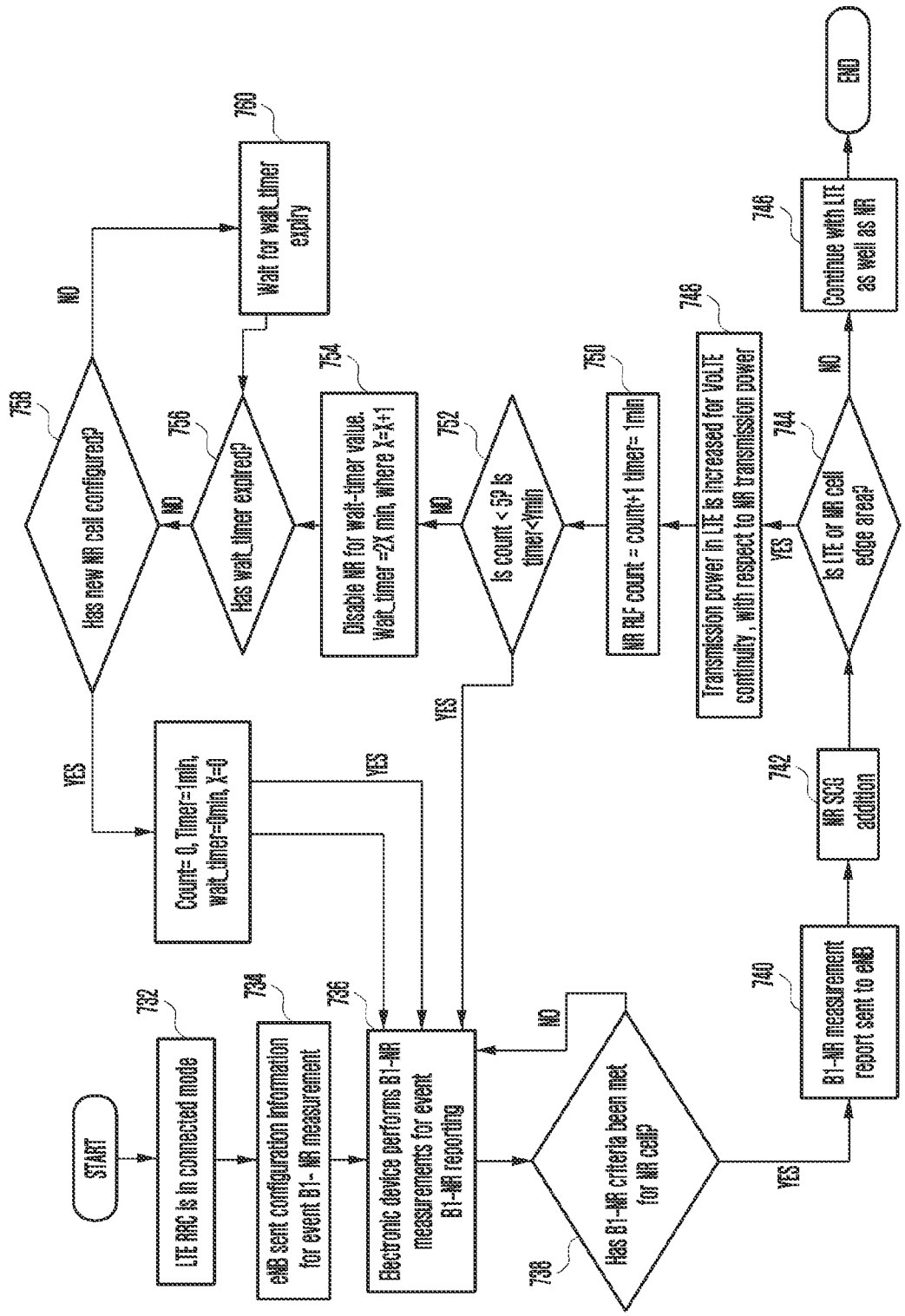
FIG. 7B illustrates a method for monitoring frequent NR RLF due to transmission power limitation in NR cell edge area according to an embodiment.

FIG. 7B illustrates a method for monitoring frequent NR RLF due to transmission power limitation in NR cell edge area according to an embodiment.

At step 732, the electronic device 302 is in RRC connected mode with base station 306. At step 734, the base station 306 transmits configuration information for event B1-NR measurement to the electronic device 302. At step 736, the electronic device 302 performs B1-NR measurements. At step 738, the electronic device 302 determines whether the B1 criteria is met for the NR cell. The base station 306 indicates a trigger threshold value for triggering the electronic device 302 to transmit a B1-NR measurement report. Based on the trigger threshold value, the electronic device 302 determines whether the B1 criteria is met for the NR cell. At step 740, the B1-NR measurement report is transmitted to the base station 306, if the B1 criteria is met for the NR cell, and if the B1 criteria is not met, the step 736 is repeated to perform B1-NR measurements.

At step 742, the NR SCG is added by the base station 306 to the electronic device 302. At step 744, the electronic device 302 via the network management system 304 determines whether the electronic device 302 is in LTE or NR cell edge area. At step 746, the electronic device 302 continues with LTE as the MCG and the NR as the SCG, if the electronic device 302 is not in LTE or an NR cell edge area. At step 748, the network management system 304 may increase the transmission power of an LTE communication with respect to the transmission power of NR communication for VoLTE continuity, if the electronic device 302 is in LTE or the NR cell edge area. For example, the transmission power of LTE communication is increased to A % or more and the transmission power of LTE communication is B or less. At step 750, the NR RLF is monitored, since the LTE communication is provided with greater transmission power than the NR transmission power. A counter for an NR RLF count and a timer for an NR RLF time is assigned and incremented by '1' and a timer for NR RLF is assigned and incremented as 1 minute by the network management system 304, if the NR RLF is encountered at step 750. At step 752, it is determine whether the NR RLF failure count is less than a pre-defined count, such as a 5 count, and it is determined whether the NR RLF failure time is less than a second pre-defined time, such as Y minutes. The pre-defined count of count 5 is an example, however, and may be any number of counts as required. If the NR RLF failure time and the NR RLF failure time is determined to be less than the pre-defined count and second pre-defined time respectively, step 736 is repeated to perform B1-NR measurements. At step 754, the NR capability of the electronic device 302 is disabled for the wait timer of the first pre-defined time. The wait timer may be iteratively increased if the B1-NR measurement report is transmitted for greater than 5 counts for more than two times (i.e. 10 or more reports) or the timer is expired more than once (greater than Y minutes) after receiving event B1-NR configuration. At step 756, the electronic device 302 via the network management system 304 determines whether the wait timer has expired. If the wait timer has expired, step 736 is repeated, and if not, at step 758, the network management system 304 determines whether the new NR cell is configured by the base station 306. At step 760, the network management system 304 waits for wait timer expiration, if the new NR cell is not configured. At step 762, the counter for the report transmission count, wait timer to wait for the first predefined time, the timer to watch the second pre-defined time ('Y' minutes), and the iterative factor 'X' are reset to zero by the network management system 304, if the new NR cell is configured, and step 706 is repeated to add the SCG.

Figure 7C:
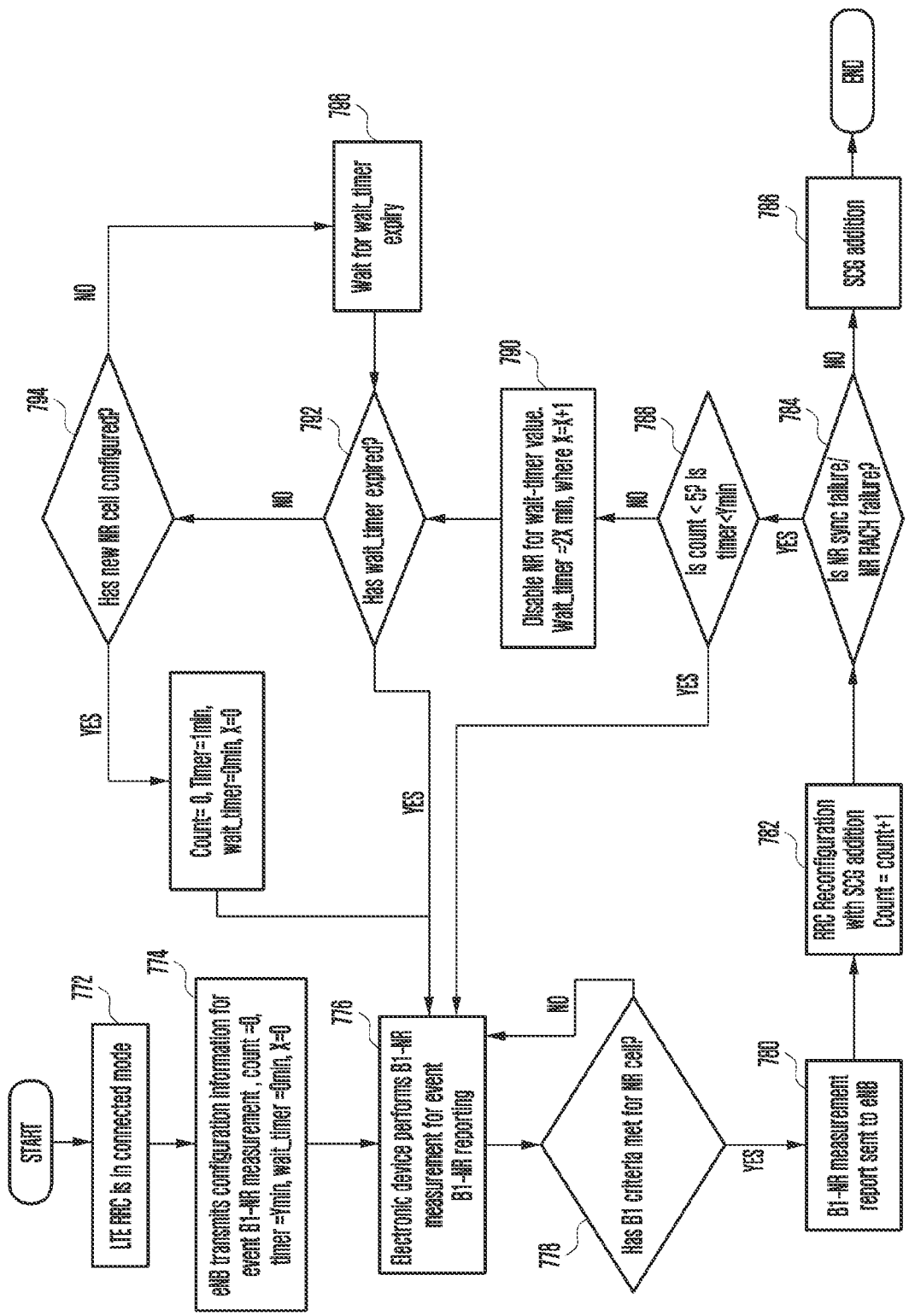
FIG. 7C illustrates a method for monitoring frequent NR sync failure or NR RACH failure according to an embodiment.

FIG. 7C illustrates a method for monitoring frequent NR sync failure or NR RACH failure according to an embodiment.

At step 772, the electronic device 302 is in RRC connected mode with base station 306. At step 774, the base station 306 transmits configuration information for event B1-NR measurement to the electronic device 302. A counter for a report transmission count, a wait timer to wait for a first predefined time, a timer to watch a second pre-defined time ('Y' minutes), an iterative factor 'X' is assigned by the network management system 304 and reset to zero. At step 776, the electronic device 302 performs B1-NR measurements. At step 778, the electronic device 302 determines whether the B1 criteria are met for the NR cell. The base station 306 indicates a trigger threshold value for triggering the electronic device to transmit a B1-NR measurement report. Based on the trigger threshold value, the electronic device 302 determines whether the B1 criteria is met for the NR cell. At step 780, the B1-NR measurement report is transmitted to the base station 306, if the B1 criteria is met for the NR cell, and if not, step 776 is repeated to perform B1-NR measurements. At step 782, the RRC reconfiguration with the SCG is added to the electronic device 302 by the base station 306 and a pre-defined count for report transmission count is incremented by '1'. At step 784, the electronic device 302 via the network management system 304 monitors to determine whether there is NR synchronization failure or NR RACH failure. At step 786, the SCG is added by the base station 306, if there is no NR synchronization failure or NR RACH failure. At step 788, the counter for the report transmission count is compared with a pre-defined count, such as 5 counts, and the timer is compared with the second pre-defined time, such as Y minutes. The pre-defined count of count 5 is for exemplary purpose, however, the pre-defined count can be any number of counts as required. If the pre-defined count and the second pre-defined time is lesser than 5 count and Y mins respectively, then the step 776 is repeated. At step 790, the NR capability of the electronic device 302 is disabled for wait timer of the first predefined time if pre-defined count and the second pre-defined time is greater than 5 count and Y mins respectively. The wait timer may be iteratively increased if the B1-NR measurement report is transmitted greater than 5 counts for more than two or more times (i.e. 10 or more reports) or the timer is expired more than once (greater than Y minutes) after receiving event B1-NR configuration. At step 792, the electronic device 302 via the network management system 304 determines whether the wait timer has expired. If the wait timer has expired, step 776 is repeated. At step 794, the network management system 304 determines whether the new NR cell is configured by the base station 306. At step 796, the method waits for expiration of the wait timer, if the new NR cell is not configured. At step 798, the counter for the report transmission count, wait timer to wait for the first predefined time, the timer to watch the second pre-defined time ('Y' minutes), and the iterative factor 'X' are reset to zero by the network management system 304, if the new NR cell is configured, and step 776 is repeated to perform NR measurements and in turn, add the SCG.

Figure 8A:
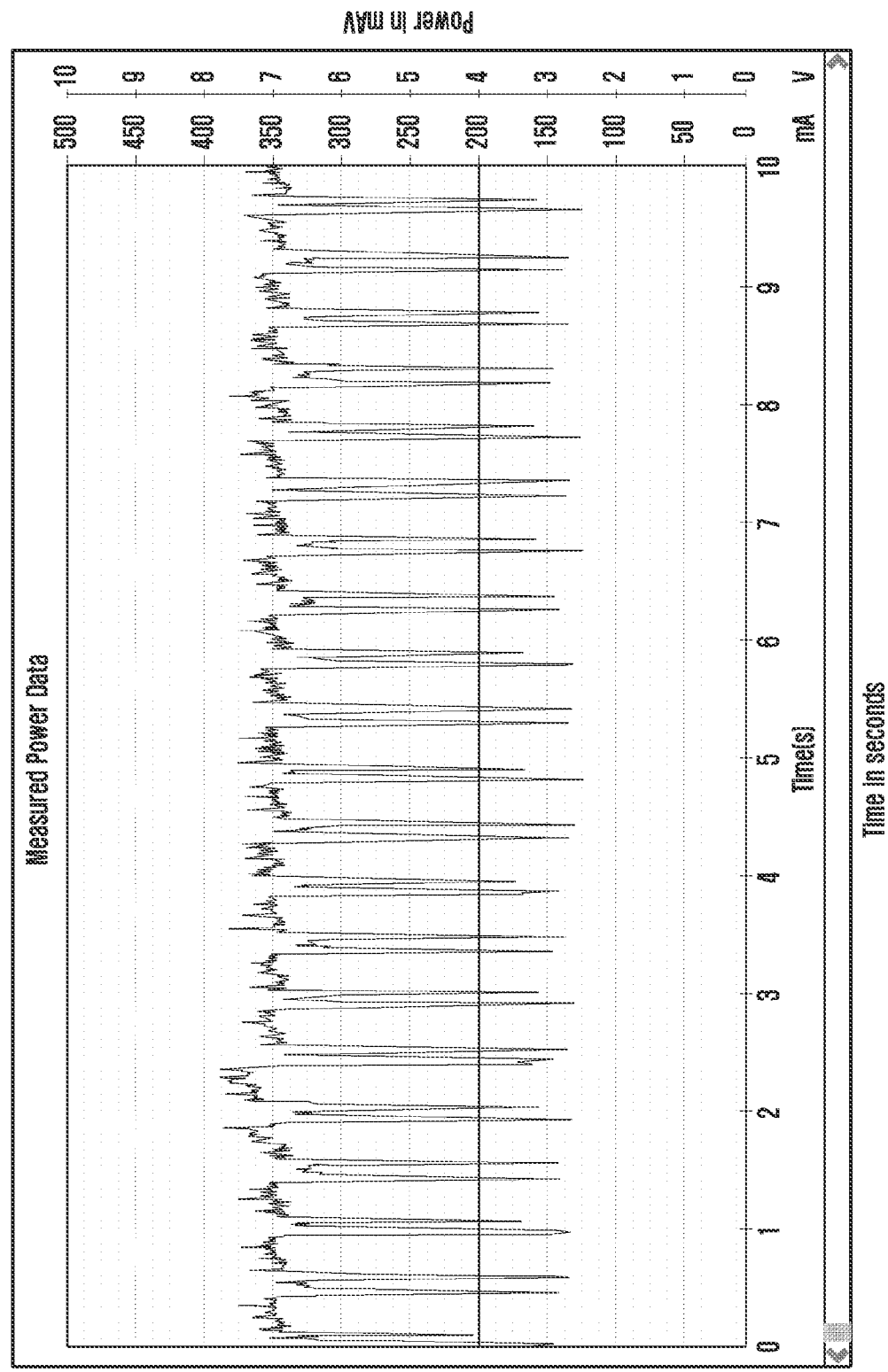
FIGS. 8A and 8B illustrate a power consumption comparison while performing NR measurements using the electronic device with and without using the network management, according to embodiments.
Figure 8B:
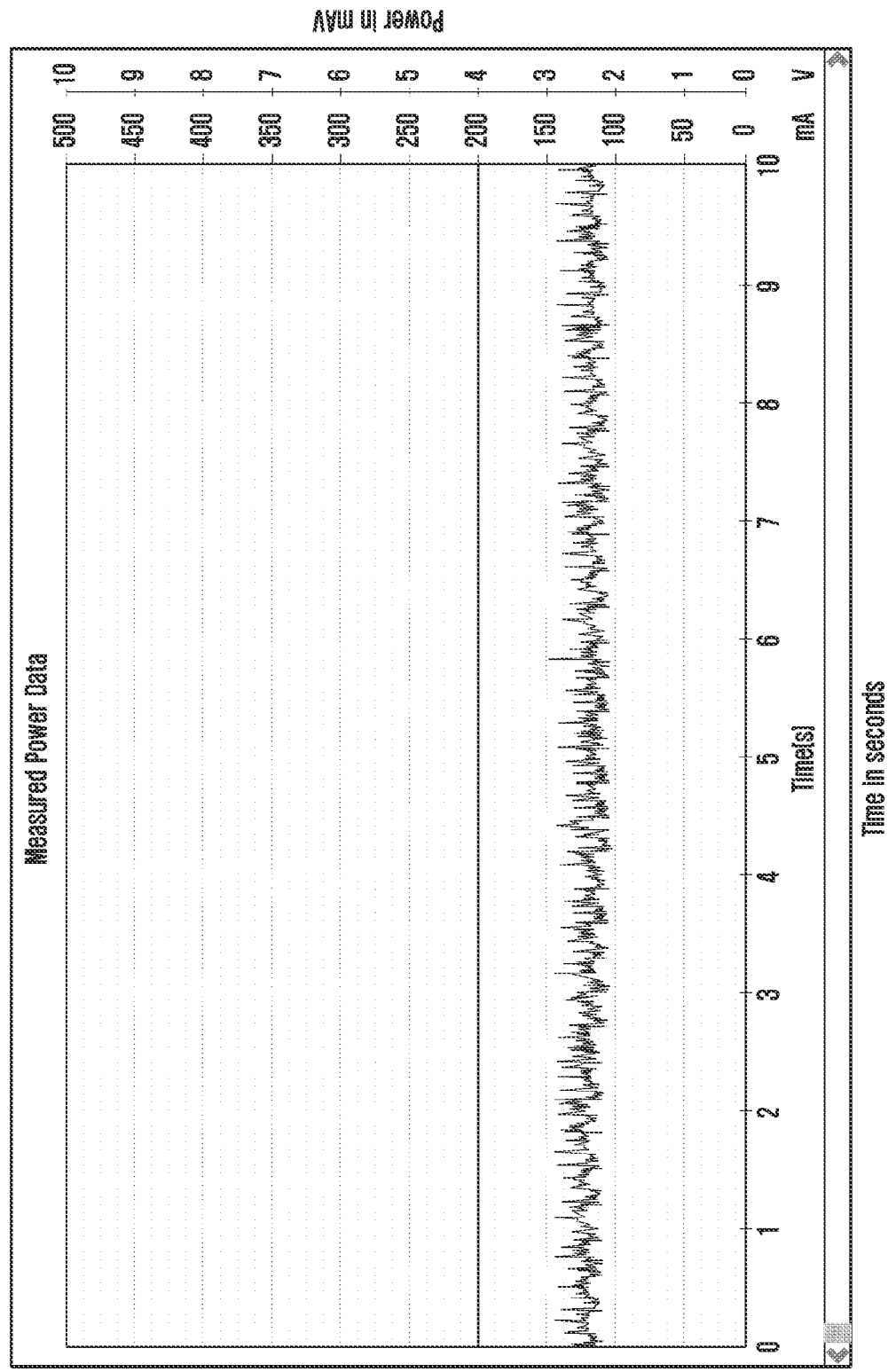

FIGS. 8A and 8B illustrate a power consumption comparison while performing NR measurements using the electronic device with and without using the network management, according to embodiments. In FIG. 8A, while performing NR measurements, the power of the electronic device may be consumed more approximately 320 mA, without using the network management system. By using the network management system of the present disclosure, the power of the electronic device may be consumed less for example, approximately, 130 mA as illustrated in FIG. 8B, while performing NR measurements. Embodiments herein reduce power consumption of the electronic device without performing unnecessary NR measurements, which require NR-radio frequency (NR-RF) and protocol stack of the electronic device to be turned on. Embodiments herein provides optimizing NR (such as 5G) connectivity in a non-standalone (NSA) mode to minimize power consumption and frequent data stall in the electronic device.

A method and a system for managing NR communication in the electronic device is disclosed. The illustrated steps are set out to explain the described embodiments, and it should be anticipated that ongoing technological development will change the manner in which particular functions are performed. These examples are presented herein for purposes of illustration, and not limitation. The boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While the disclosure has been particularly shown and described with reference to embodiments thereof, it will be understood by those skilled in the art that various changes in form and details may be made therein without departing from the scope of the subject matter as defined by the appended claims and their equivalents.

What is claimed is:

1. An electronic device, comprising:
wireless communication circuitry capable of supporting dual connectivity for a first cellular communication network and a second cellular communication network;
at least one processor operatively connected with the wireless communication circuitry; and
memory operatively connected to the at least one processor, wherein the memory stores instructions that, when executed by the at least one processor individually or collectively, cause the electronic device to:
establish a connection with the second cellular communication network as a secondary cell group (SCG) based at least in part on control information received from the first cellular communication network,
monitor a condition of the electronic device corresponding to no mobile data activity or mobile data activity below a predetermined activity threshold performed by the wireless communication circuitry, and
report, if the condition is satisfied, an SCG failure to one of the first cellular communication network and the second cellular communication network for releasing the second cellular communication network.

2. The electronic device of claim 1, wherein the instructions, when executed by the at least one processor individually or collectively, further cause the electronic device to:
restrict measurements for the second cellular communication network if the condition is satisfied.

3. The electronic device of claim 2,
wherein the measurements for the second cellular communication network correspond to B1 new radio (B1-NR) measurements.

4. The electronic device of claim 1, wherein the instructions, when executed by the at least one processor individually or collectively, further cause the electronic device to:
receive, from the first cellular communication network, configuration information for an event B1-NR measurement.

5. The electronic device of claim 4,
wherein the configuration information indicates a trigger threshold value for triggering the electronic device to transmit a B1-NR measurement report.

6. The electronic device of claim 5, wherein the instructions, when executed by the at least one processor individually or collectively, further cause the electronic device to:
transmit the B1-NR measurement report to add the second cellular communication network as the SCG.

7. The electronic device of claim 5, wherein the instructions, when executed by the at least one processor individually or collectively, further cause the electronic device to:
configure multiple new radio (NR) frequencies for the event B1-NR measurement.

8. The electronic device of claim 1,
wherein the electronic device is an evolved universal mobile telecommunications system (UMTS) terrestrial radio access network (E-UTRAN) NR dual connectivity (EN-DC) capable electronic device.

9. The electronic device of claim 1,
wherein the condition includes at least one of no mobile data activity, mobile data activity below the predetermined activity threshold, turning off a mobile data function of the electronic device, or connecting to wireless fidelity (Wi-Fi) during the connection with the second cellular communication network.

10. The electronic device of claim 1, wherein the instructions, when executed by the at least one processor individually or collectively, further cause the electronic device to:
determine that the mobile data activity below the predetermined activity threshold is satisfied if a mobile data throughput is less than the predetermined activity threshold based on the monitoring during the connection with the second cellular communication network.

11. The electronic device of claim 1,
wherein no mobile data activity or mobile data activity below the predetermined activity threshold is determined based on information from at least one of a packet data convergence protocol or a medium access control layer—buffer status report (MAC—BSR) performed by the wireless communication circuitry of the electronic device.

12. The electronic device of claim 1, wherein the instructions, when executed by the at least one processor individually or collectively, further cause the electronic device to:
establish the connection with the second cellular communication network by reconfiguring a radio resource control (RRC) connection, with an SCG addition based at least in part on the control information.

13. The electronic device of claim 1, wherein the instructions, when executed by the at least one processor individually or collectively, further cause the electronic device to:
if the condition is satisfied, stop a measurement report for the second cellular communication network.

14. An electronic device, comprising:
wireless communication circuitry capable of supporting dual connectivity for a first cellular communication network and a second cellular communication network;
at least one processor operatively connected with the wireless communication circuitry; and
memory operatively connected to the at least one processor, wherein the memory stores instructions that, when executed by the at least one processor individually or collectively, cause the electronic device to:
establish a connection with the second cellular communication network as a secondary cell group (SCG) based at least in part on control information received from the first cellular communication network,
monitor a condition of the electronic device corresponding to no mobile data activity or mobile data activity below a predetermined activity threshold performed by the wireless communication circuitry, and
release, if the condition is satisfied, the second cellular communication network and stop a measurement report for the second cellular communication network.

15. An electronic device, comprising:
wireless communication circuitry capable of supporting dual connectivity for a first cellular communication network and a second cellular communication network;
at least one processor operatively connected with the wireless communication circuitry; and
memory operatively connected to the at least one processor, wherein the memory stores instructions that, when executed by the at least one processor individually or collectively, cause the electronic device to:
establish a connection with the second cellular communication network as a secondary cell group (SCG) based at least in part on control information received from the first cellular communication network,
monitor a condition of the electronic device corresponding to no mobile data activity or mobile data activity below a predetermined activity threshold performed by the wireless communication circuitry, and
restrict, if the condition is satisfied, the second cellular communication network capability of the electronic device for the second cellular communication network.

16. An electronic device, comprising:
wireless communication circuitry capable of supporting dual connectivity for a first cellular communication network and a second cellular communication network;
at least one processor operatively connected with the wireless communication circuitry; and
memory operatively connected to the at least one processor, wherein the memory stores instructions that, when executed by the at least one processor individually or collectively, cause the electronic device to:
establish a connection with the second cellular communication network as a secondary cell group (SCG) based at least in part on configuration information received from the first cellular communication network,
monitor a condition of the electronic device corresponding to no mobile data activity or mobile data activity below a predetermined activity threshold performed by the wireless communication circuitry, and
release, if the condition is satisfied, the second cellular communication network.

17. An electronic device, comprising:
wireless communication circuitry capable of supporting dual connectivity for a first cellular communication network and a second cellular communication network;
at least one processor operatively connected with the wireless communication circuitry; and
memory operatively connected to the at least one processor, wherein the memory stores instructions that, when executed by the at least one processor, cause the electronic device to:
establish a connection with the second cellular communication network as a secondary cell group (SCG) based at least in part on control information received from the first cellular communication network,
identify if no mobile data activity or mobile data activity below a predetermined activity threshold is performed by the wireless communication circuitry, and
based on identifying that no mobile data activity or mobile data activity below the predetermined activity threshold is performed by the wireless communication circuitry, report an SCG failure to one of the first cellular communication network and the second cellular communication network for releasing the second cellular communication network.

18. An electronic device, comprising:
wireless communication circuitry capable of supporting dual connectivity for a first cellular communication network and a second cellular communication network;
at least one processor operatively connected with the wireless communication circuitry; and
memory operatively connected to the at least one processor, wherein the memory stores instructions that, when executed by the at least one processor individually or collectively, cause the electronic device to:

establish a connection with the second cellular communication network as a secondary cell group (SCG) based at least in part on configuration information received from the first cellular communication network, identify if no mobile data activity or mobile data activity below a predetermined activity threshold is performed by the wireless communication circuitry, and based on identifying that no mobile data activity or mobile data activity below the predetermined activity threshold is performed by the wireless communication circuitry, release the second cellular communication network.

* * * * *